United States Patent
Wakasu

[19]

[11] Patent Number: 5,831,634
[45] Date of Patent: Nov. 3, 1998

[54] THREE-DIMENSIONAL GRAPHIC CONTROLLER

[75] Inventor: Yutaka Wakasu, Tokyo, Japan

[73] Assignee: NEC Corporation, Tokyo, Japan

[21] Appl. No.: 773,325

[22] Filed: Dec. 24, 1996

[30] Foreign Application Priority Data

Dec. 25, 1995 [JP] Japan .................................. 7-336620

[51] Int. Cl.$^6$ .................................................. G06F 15/00
[52] U.S. Cl. ............................................................ 345/441
[58] Field of Search ..................................... 345/441, 433, 345/118, 121, 470

[56] References Cited

U.S. PATENT DOCUMENTS 5,396,586  3/1995  Van Aken ................................ 395/141

Primary Examiner—Phu K. Nguyen
Attorney, Agent, or Firm—Foley & Lardner

[57] ABSTRACT

A three-dimensional computer graphic controller comprises a resistor for receiving information about the triangle, a Y-coordinate counter for fetching the stored information from the resistor and computing Y-coordinates of the triangle, an X-coordinate initial position adder for fetching an information about the first edge of the triangle from the resistor and computing an X-coordinate value of an initial position of the first edge, an X-coordinate width adder for fetching the information about the divided upper and lower triangles and computing individual widths of the triangle on the X-coordinate as well as for changing a variation in width on the X-coordinate between the divided upper and lower triangles, a color component adder for fetching the information about the triangle and individually computing red, green and blue components of the color of the triangle, a frame memory controller for fetching the Y-coordinates, the X-coordinate value of the start position and the individual widths triangle on the X-coordinate to control storing the same into a frame memory, and a line buffer with a capacity corresponding to a line for fetching the red, green and blue components from the color component adder and storing the same.

16 Claims, 9 Drawing Sheets

FIG. 6

| | |
|---|---|
| 501 | START/STATUS FLAG |
| 502 | X-COORDINATE OF THE FIRST VERTEX |
| 503 | Y-COORDINATE OF THE FIRST VERTEX |
| 504 | WIDTH ON THE y-COORDINATE OF THE GEOMETRY-PROCESSED TRIANGLE |
| 505 | WIDTH OF A SPAN INCLUDING THE FIRST VERTEX |
| 506 | VARIATIONS IN X-COORDINATE OF THE THIRD EDGE |
| 507 | Y-COORDINATE OF THE SECOND VERTEX |
| 508 | VARIATIONS IN WIDTH ON THE X-COORDINATE OF THE UPPER TRIANGLE |
| 509 | VARIATIONS IN WIDTH ON THE X-COORDINATE OF THE LOWER TRIANGLE |
| 510 | INITIAL VALUE OF THE RED COMPONENT OF THE FIRST VERTEX |
| 511 | VARIATIONS IN THE RED COMPONENT OF POINTS ON THE THIRD EDGE |
| 512 | VARIATION IN THE RED COMPONENT IN X-DIRECTION |
| 513 | INITIAL VALUE OF THE GREEN COMPONENT OF THE FIRST VERTEX |
| 514 | VARIATIONS IN THE GREEN COMPONENT OF POINTS ON THE THIRD EDGE |
| 515 | VARIATION IN THE GREEN COMPONENT IN X-DIRECTION |
| 516 | INITIAL VALUE OF THE BLUE COMPONENT OF THE FIRST VERTEX |
| 517 | VARIATIONS IN THE BLUE COMPONENT OF POINTS ON THE THIRD EDGE |
| 518 | VARIATION IN THE BLUE COMPONENT IN X-DIRECTION |

FIG. 9

| | |
|---|---|
| 801 | START/STATUS FLAG |
| 802 | X-COORDINATE OF THE FIRST VERTEX |
| 803 | Y-COORDINATE OF THE FIRST VERTEX |
| 804 | WIDTH ON THE y-COORDINATE OF THE GEOMETRY-PROCESSED TRIANGLE |
| 805 | WIDTH OF A SPAN INCLUDING THE FIRST VERTEX |
| 806 | VARIATIONS IN X-COORDINATE OF THE THIRD EDGE |
| 807 | Y=COORDINATE OF THE SECOND VERTEX |
| 808 | VARIATIONS IN WIDTH ON THE X-COORDINATE OF THE UPPER TRIANGLE |
| 809 | VARIATIONS IN WIDTH ON THE X-COORDINATE OF THE LOWER TRIANGLE |
| 810 | INITIAL VALUE OF THE RED COMPONENT OF THE FIRST VERTEX |
| 811 | VARIATIONS IN THE RED COMPONENT OF POINTS ON THE THIRD EDGE |
| 812 | VARIATION IN THE RED COMPONENT IN X-DIRECTION |
| 813 | INITIAL VALUE OF THE GREEN COMPONENT OF THE FIRST VERTEX |
| 814 | VARIATIONS IN THE GREEN COMPONENT OF POINTS ON THE THIRD EDGE |
| 815 | VARIATION IN THE GREEN COMPONENT IN X-DIRECTION |
| 816 | INITIAL VALUE OF THE BLUE COMPONENT OF THE FIRST VERTEX |
| 817 | VARIATIONS IN THE BLUE COMPONENT OF POINTS ON THE THIRD EDGE |
| 818 | VARIATION IN THE BLUE COMPONENT IN X-DIRECTION |
| 819 | Z-VALUE OF THE FIRST VERTEX |
| 820 | VARIATIONS IN Z-VALUE ON THE THIRD EDGE |
| 821 | VARIATION IN Z-VALUE IN X-DIRECTION |

THREE-DIMENSIONAL GRAPHIC CONTROLLER

BACKGROUND OF THE INVENTION

The present invention relates to a three-dimensional computer graphic controller.

In recent years, the requirement for high speed processing of the three-dimensional computer graphics for real time display thereof has been on the increase.

The basic algorithm of the three-dimensional computer graphic processing will be described with reference to FIG. 1 as follows. The basic algorithm of the three-dimensional computer graphic processing comprises a geometry accelerator 908 and a subsequent rasterizer 909. The geometry accelerator 908 includes a conversion 901 into a visual field coordinate system, a writing 902, a conversion 903 coordinate system, a clipping 904, and a conversion 905 of a window coordinate system. The rasterizer 909 includes a rasterization 906 and a pixel operation 907.

In the above three-dimensional computer graphic processing, the rasterizer 909 is the time consuming processing, for which reason in order to shorten the time of the above three-dimensional computer graphic processing, it is effective to process the rasterizer 909 by the hardware.

In the prior art, it was proposed that the pixel operation 907 of the rasterizer 909 is performed by the hardware in a digital differential analyzer system in order to apply the same to a Z-buffer method. This technique is disclosed in the Japanese laid-open patent publication No. 5-210744. The geometry accelerator 908 and subsequent rasterization 906 are executed by the software wherein positions, colors, color variation of, Z-value and Z-value variation of spans are calculated. Subsequently, the pixel operation 907 is performed by the hardware. Since in the above prior art technique the rasterization 906 remains performed by the software, it was difficult to obtain a further reduction in time of the above three-dimensional computer graphic processing even it had been required to shorten the process time as much as possible.

SUMMARY OF THE INVENTION

Accordingly, it is an object of the present invention to provide a novel three-dimensional computer graphic controller free from the problem as described above.

It is a further object of the present invention to provide a novel three-dimensional computer graphic controller capable of a substantial reduction in time of three-dimensional computer graphic processing.

It is a further more object of the present invention to provide a novel three-dimensional computer graphic controller capable of a substantial reduction in time of the rasterization.

It is a still further object of the present invention to provide a novel three-dimensional computer graphic controller wherein both the rasterization and subsequent pixel operation are carried out by a hardware.

It is yet a further object of the present invention to provide a novel three-dimensional computer graphic controller wherein positions, colors, color variation of, Z-value and Z-value variation of spans are calculated by a hardware in a digital differential analyzer system.

The above and other objects, features and advantages of the present invention will be apparent from the following descriptions.

In accordance with the first present invention, a three-dimensional computer graphic controller provided in a three-dimensional computer graphic system utilizing a priority processing method, wherein a geometry-processed triangle is so set on a X-Y coordinate system that the geometry-processed triangle comprises a first vertex having a highest Y-coordinate value, a second vertex having a lowest Y-coordinate value, a third vertex having an intermediate Y-coordinate value between the highest and lowest Y-coordinate values of the first and second vertexes, a first edge including the first and second vertexes, a second edge including the second and third vertexes and a third edge including the first and third vertexes, before the geometry-processed triangle is divided by a line parallel to the X-coordinate and extending on the third vertex and across the first edge into a divided upper triangle and a divided lower triangle. The three-dimensional computer graphic controller comprises a resistor for receiving information about the geometry-processed triangle and the divided upper and lower triangles and storing the same, a Y-coordinate counter coupled to the resistor for fetching the stored information about the geometry-processed triangle from the resistor and computer Y-coordinates of the triangle, an X-coordinate initial position adder coupled to the resistor for fetching an information about the first edge of the geometry-processed triangle from the resistor and computing an X-coordinate value of an initial position of the first edge of the triangle, an X-coordinate width adder coupled to the resistor for fetching the information about the divided upper and lower triangles from the resistor and computing individual widths of the divided upper and lower triangles on the X-coordinate as well as for changing a variation in width on the X-coordinate between the divided upper and lower triangles, a color component adder coupled to the resistor for fetching the information about the geometry-processed triangle and the divided upper and lower triangles from the resistor and individually computing red, green and blue components of the color of the geometry-processed triangle and the divided upper and lower triangles, a frame memory controller coupled to the Y-coordinate counter, the X-coordinate initial position adder and the X-coordinate width adder for fetching the Y-coordinates of the triangle from the Y-coordinate counter, the X-coordinate value of the start position from the X-coordinate initial position adder and the individual widths of the divided upper and lower triangles on the X-coordinate from the X-coordinate width adder so as to control storing the Y-coordinates of the triangle, the X-coordinate value of the start position and the individual widths of the divided upper and lower triangles on the X-coordinated into a frame memory coupled to the frame memory controller, and a line buffer with a capacity corresponding to a line and being coupled to the color component adder for fetching the red, green and blue components from the color component adder and storing the fetched red, green and blue components therein.

In accordance with the second present invention, a three-dimensional computer graphic controller provided in a three-dimensional computer graphic system utilizing a Z-buffer method, wherein a geometry-processed triangle is so set on an X-Y coordinate system that the geometry-processed triangle comprises a first vertex having a highest Y-coordinate value, a second vertex having a lowest Y-coordinate value, a third vertex having an intermediate Y-coordinate value between the highest and lowest Y-coordinated values of the first and second vertexes, a first edge including the first and second vertexes, a second edge including the second and third vertexes and a third edge including the first and third vertexes, before the geometry-processed triangle is divided by a line parallel to the X-coordinate and extending on the third vertex and across the first edge into a divided upper triangle and a divided lower triangle. The three-dimensional computer graphic controller comprises a resistor for receiving information about the geometry-processed triangle and the divided upper and lower triangles and storing the same, a Y-coordinate counter coupled to the resistor for fetching the stored information about the geometry-process triangle for the resistor and computing Y-coordinates of the triangle, an X-coordinate initial position adder coupled to the resistor for fetching an information about the first edge of the geometry-processed triangle from the resistor and computing an X-coordinate value of an initial position of the first edge of the triangle, an X-coordinate width adder coupled to the resistor for fetching the information about the divided upper and lower triangles from the resistor and computing individual widths of the divided upper and lower triangles on the X-coordinate as well as for changing a variation in width on the X-coordinate between the divided upper and lower triangles, a color component adder coupled to the resistor for fetching the information about the geometry-processed triangle and the divided upper and lower triangles from the resistor and individually computing red, green and blue components of the color of the geometry-processed triangle and the divided upper and lower triangles, a frame memory controller coupled to the Y-coordinate counter, the X-coordinate initial position adder and the X-coordinate width adder for fetching the Y-coordinates of the triangle from the Y-coordinate counter, the X-coordinate value of the start position from the X-coordinate initial position adder and the individual widths of the divided upper and lower triangles on the X-coordinate from the X-coordinate width adder so as to control storing the Y-coordinates of the triangle, the X-coordinate value of the start position and the individual widths of the divided upper and lower triangles on the X-coordinate into a frame memory coupled to the frame memory controller, a line buffer with a capacity corresponding to a line and being coupled to the color component adder for fetching the red, green and blue components from the color component adder and storing the fetched red, green and blue components therein, a Z-value adder coupled to said resistor for receipt of a Z-value of the first vertex of the geometry-processed triangle, variations in Z-value of points on the first edge of the geometry-processed triangle and variations in Z-value in an X-direction parallel to an X-coordinate axis and computing Z-values of an object, a Z-buffer having a capacity corresponding to one line and being coupled to the frame memory for fetching Z-buffer data from the frame memory and storing the Z-buffer data therein, a Z-buffer controller coupled to the Z-buffer for controlling the Z-buffer, a Z-comparator coupled to the Z-value adder and the Z-buffer for comparing the stored Z-buffer data with the computed Z-values of the object, and a mask buffer coupled via the Z-buffer controller and the Z-comparator to the Z-value adder and also coupled to the memory controller for storing one bit information to be supplied to the memory controller so that according to the one bit information the memory controller controls the frame memory to store the computed Z-values of the object when the computed Z-value from the Z-value adder is more distant from the viewpoint than the Z-buffer data stored in the Z-buffer.

BRIEF DESCRIPTIONS OF THE DRAWINGS

Preferred embodiments according to the present invention will be described in detail with reference to the accompanying drawings.

FIG. 6 is a view illustrative of information data computed by software for use thereof by a three-dimensional computer graphic controller in a first embodiment according to the present invention.

FIG. 9 is a view illustrative of information data computed by software for use thereof by a three-dimensional computer graphic controller in a second embodiment according to the present invention.

DISCLOSURE OF THE INVENTION

Figure 1:
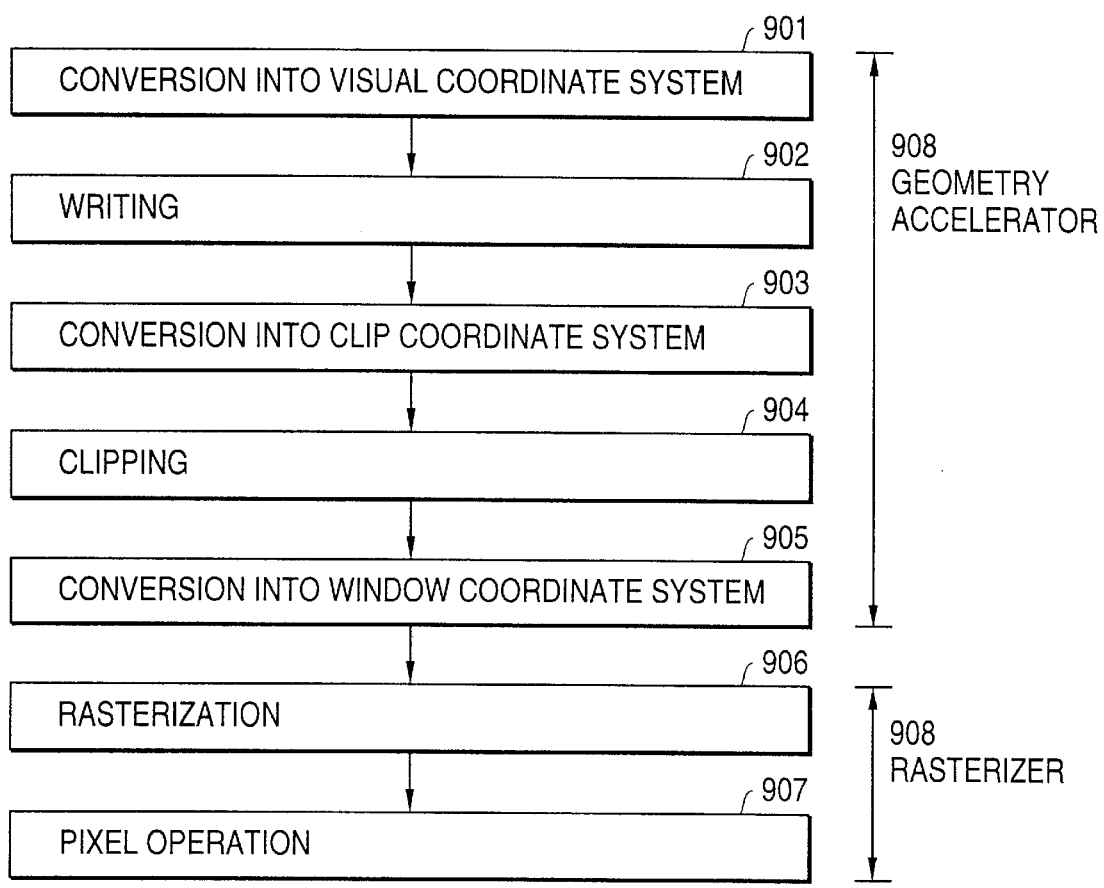
FIG. 1 is a flow chart illustrative of the conventional basic algorithm of the three-dimensional computer graphic processing.

In accordance with the first present invention, a three-dimensional computer graphic controller provided in a three-dimensional computer graphic system utilizing a priority processing method, wherein a geometry-processed triangle is so set on a X-Y coordinate system that the geometry-processed triangle comprises a first vertex having a highest Y-coordinate value, a second vertex having a lowest Y-coordinate value, a third vertex having an intermediate Y-coordinate value between the highest and lowest Y-coordinate values of the first and second vertexes, a first edge including the first and second vertexes, a second edge including the second and third vertexes and a third edge including the first and third vertexes, before the geometry-processed triangle is divided by a line parallel to the X-coordinate and extending on the third vertex and across the first edge into a divided upper triangle and a divided lower triangle. The three-dimensional computer graphic controller comprises a resistor for receiving information about the geometry-processed triangle and the divided upper and lower triangles and storing the same, a Y-coordinate counter coupled to the resistor for fetching the stored information about the geometry-processed triangle from the resistor and computing Y-coordinates of the triangle, an X-coordinate initial position adder coupled to the resistor for fetching an information about the first edge of the geometry-processed triangle from the resistor and computing an X-coordinate value of an initial position of the first edge of the triangle, an X-coordinate width adder coupled to the resistor for fetching the information about the divided upper and lower triangles from the resistor and computing individual widths of the divided upper and lower triangles on the X-coordinate as well as for changing a variation in width on the X-coordinate between the divided upper and lower triangles, a color component adder coupled to the resistor for fetching the information about the geometry-processed triangle and the divided upper and lower triangles from the resistor and individually computing red, green and blue components of the color of the geometry-processed triangle and the divided upper and lower triangles, a frame memory controller coupled to the Y-coordinate counter, the X-coordinate initial position adder and the X-coordinate width adder for fetching the Y-coordinates of the triangle from the Y-coordinate counter, the X-coordinate value of the start position from the X-coordinate initial position adder and the individual widths of the divided upper and lower triangles on the X-coordinate from the X-coordinate width adder so a stop control storing the Y-coordinates of the triangle, the X-coordinate value of the start position and the individual widths of the divided upper and lower triangles on the X-coordinate into a frame memory coupled to the frame memory controller, and a line buffer with a capacity corresponding to a line and being coupled to the color component adder for fetching the red, green and blue components from the color component adder and storing the fetched red, green and blue components therein.

The above three-dimensional computer graphic controller may further have a line buffer controller to the line buffer for controlling the line buffer.

The above three-dimensional computer graphic controller may further have a sequenser for controlling the resistor, the Y-coordinate counter, X-coordinate initial position adder, the X-coordinate width adder and the color component adder.

The color component adder may comprise a red color component adder coupled to the resistor for fetching the information about the geometry-processed triangle and the divided upper and lower triangles from the resistor and computing a red component of the color of the geometry-processed triangle and the divided upper and lower triangles, a green color component adder coupled to the resistor for fetching the information about the geometry-processed triangle and the divided upper and lower triangles from the resistor and computing a green component of the color of the geometry-processed triangle and the divided upper and lower triangles, and a blue color component adder coupled to the resistor for fetching the information about the geometry-processed triangle and the divided upper and lower triangles from the resistor and computing a blue component of the color of the geometry-processed triangle and the divided upper and lower triangles.

The resistor stores software-computed values of the X-coordinate of the first vertex, the Y-coordinate of the first vertex, a width on the y-coordinate of the geometry-processed triangle, a width of a span including the first vertex, variations in X-coordinate of the third edge of the geometry-processed triangle, a Y-coordinate of the second vertex of the geometry-processed triangle, variations in width on the X-coordinate of the divided upper triangle, variations in width on the X-coordinate of the divided lower triangle, an initial value of the red component of the first vertex of the geometry-processed triangle, variations in the red component of points on the first edge of the geometry-processed triangle, variation in the red component of the geometry-processed triangle in an X-direction parallel to an X-coordinate axis, an initial value of the green component of the first vertex of the geometry-processed triangle, variations in the green component of points on the first edge of the geometry-processed triangle, variation in the green component of the geometry-processed triangle in the X-direction, an initial value of the blue component of the first vertex of the geometry-processed triangle, variations in the blue component of points on the first edge of the geometry-processed triangle, and variation in the blue component of the geometry-processed triangle in the X-direction.

The X-coordinate initial position adder may comprise a latch circuit for holding a signal of an X-coordinate initial position of the first edge of the triangle, an adder having two input terminals, one of which is coupled to an output terminal of the latch circuit for receipt of an output signal of the X-coordinate initial position from the latch circuit whilst the other is coupled to the resistor for receiving signals of variations in initial position of the first edge of the triangle so that the adder performs operation of adding variations in initial position of the first edge into the X-coordinate initial position, and a selector having two input terminals, one of which is coupled to an output terminal of the adder for receipt of an added value of the X-coordinate initial position from the adder whilst the other is coupled to the resistor for receipt of an initial value of the X-coordinate initial position from the resistor so that the selector performs operation of selecting any of the added value and the initial value of the X-coordinate initial position as well as having an output terminal coupled to an input terminal of the latch circuit.

The X-coordinate width adder may comprise a first selector having two input terminals coupled to the resistor for receipt of signals of variations in width on the X-coordinate of the divided upper and lower triangles so that the first selector performs operation of selecting any of the variations in width on the X-coordinate of the divided upper and lower triangles, a latch circuit for holding a signal of an X-coordinate initial position of the first edge of the triangle, an adder having two input terminals, one of which is coupled to an output terminal of the latch circuit for receipt of an output signal of the X-coordinate initial position from the latch circuit whilst the other is coupled to an output of the first selector for receiving selected one of the variations in width on the X-coordinate of the divided upper and lower triangles so that the adder performs operationof adding the selected one of the variations in width on the X-coordinate of the divided upper and lower triangles into the X-coordinate initial position, and a second selector having two input terminals, one of which is coupled to an output terminal of the adder for receipt of an added value of the X-coordinate initial position from the adder whilst the other is coupled to the resistor for receipt of an initial value of the X-coordinate initial position from the resistor so that the second selector performs operation of selecting any of the added value and the initial value of the X-coordinate initial position as well as having an output terminal coupled to an input terminal of the latch circuit.

Each of the red, green and blue color component adders may comprise a first latch circuit for holding a signal of a Y-coordinate initial position of the first edge of the triangle, a first adder having two input terminals, one of which is coupled to an output terminal of the first latch circuit for receipt of an output signal of the Y-coordinate initial position from the first latch circuit whilst the other is coupled to the resistor for receiving signals of variations in initial position of the first edge of the triangle on the Y-coordinate so that the first adder performs operation of adding variations in initial position of the first edge on the Y-coordinate into the Y-coordinate initial position, a first selector having two input terminals, one of which is coupled to an output terminal of the first adder for receipt of an added value of the Y-coordinate initial position from the first adder whilst the other is coupled to the resistor for receipt of an initial value of the Y-coordinate initial position from the resistor so that the first selector performs operation of selecting any of the added value and the initial value of the Y-coordinate initial position as well as having an output terminal coupled to an input terminal of the first latch circuit, a second latch circuit for holding a signal of an X-coordinate initial position of the first edge of the triangle, a second adder having two input terminals, one of which is coupled to an output terminal of the second latch circuit for receipt of an output signal of the X-coordinate initial position from the second latch circuit whilst the other is coupled to the resistor for receiving signals of variations in initial position of the first edge of the triangle so that the second adder performs operation of adding variations in initial position of the first edge into the X-coordinate initial position, and a second selector having two input terminals, one of which is coupled to an output terminal of the second adder for receipt of an added value of the X-coordinate initial position from the adder whilst the other is coupled to the output terminal of the first selector for receipt of selected one of the added value and the initial value of the Y-coordinate initial position so that the second selector performs operation of selecting either the selected one of the added value and the initial value of the Y-coordinate initial position or the selected one of the added value and the initial value of the X-coordinate initial position as well as having an output terminal coupled to an input terminal of the second latch circuit.

In accordance with the second present invention, a three-dimensional computer graphic controller provided in a three-dimensional computer graphic system utilizing a Z-buffer method, wherein a geometry-processed triangle is so set on a X-Y coordinate system that the geometry-processed triangle comprises a first vertex having a highest Y-coordinate value, a second vertex having a lowest Y-coordinate value, a third vertex having an intermediate Y-coordinate value between the highest and lowest Y-coordinate values of the first and second vertexes, a first edge including the first and second vertexes, a second edge including the second and third vertexes and a third edge including the first and third vertexes, before the geometry-processed triangle is divided by a line parallel to the X-coordinate and extending on the third vertex and across the first edge into a divided upper triangle and a divided lower triangle. The three-dimensional computer graphic controller comprises a resistor for receiving information about the geometry-processed triangle and the divided upper and lower triangles and storing the same, a Y-coordinate counter coupled to the resistor for fetching the stored information about the geometry-processed triangle from the resistor and computing Y-coordinates of the triangle, an X-coordinate initial position adder coupled to the resistor for fetching an information about the first edge of the geometry-processed triangle from the resistor and computing an X-coordinate value of an initial position of the first edge of the triangle, an X-coordinate width adder coupled to the resistor for fetching the information about the divided upper and lower triangles from the resistor and computing individual widths of the divided upper and lower triangles on the X-coordinates as well as for changing a variation in width on the X-coordinate between the divided upper and lower triangles, a color component adder coupled to the resistor for fetching the information about the geometry-processed triangle and the divided upper and lower triangles from the resistor and individually computing red, green and blue components of the color of the geometry-processed triangle and the divided upper and lower triangles, a frame memory controller coupled to the Y-coordinate counter, the X-coordinate initial position adder and the X-coordinate width adder for fetching the Y-coordinates of the triangle from the Y-coordinate counter, the X-coordinate value of the start position from the X-coordinate initial position adder and the individual widths of the divided upper and lower triangles on the X-coordinate from the X-coordinate width adder so as to control storing the Y-coordinates of the triangle, the X-coordinate value of the start position and the individual widths of the divided upper and lower triangles on the X-coordinate into a frame memory coupled to the frame memory controller, a line buffer with a capacity corresponding to a line and being coupled to the color component adder for fetching the red, green and blue components from the color component adder and storing the fetched red, green and blue components therein, a Z-value adder coupled to said resistor for receipt of a Z-value of the first vertex of the geometry-processed triangle, variations in Z-value of points on the first edge of the geometry-processed triangle and variations in Z-value in an X-direction parallel to an X-coordinate axis and computing Z-values of an object, a Z-buffer having a capacity corresponding to one line and being coupled to the frame memory for fetching Z-buffer data from the frame memory and storing the Z-buffer data therein, a Z-buffer controller coupled to the Z-buffer for controlling the Z-buffer, a Z-comparator coupled to the Z-value adder and the Z-buffer for comparing the stored Z-buffer data with the computed Z-values of the object, and a mask buffer coupled via the Z-buffer controller and the Z-comparator to the Z-value adder and also coupled to the memory controller for storing one bit information to be supplied to the memory controller so that according to the one bit information the memory controller controls the frame memory to store the computed Z-values of the object when the computed Z-value from the Z-value adder is more distant from the viewpoint than the Z-buffer data stored in the Z-buffer.

The above three-dimensional computer graphic controller may further have a line buffer controller coupled to the line buffer for controlling the line buffer.

The above three-dimensional computer graphic controller may further have a sequenser for controlling the resistor, the Y-coordinate counter, X-coordinate initial position adder, the X-coordinate width adder, the color component adder, the Z-value adder, the Z-buffer and the Z-buffer controller.

The color component adder may comprise a red color component adder coupled to the resistor for fetching the information about the geometry-processed triangle and the divided upper and lower triangles from the resistor and computing a red component of the color of the geometry-processed triangle and the divided upper and lower triangles, a green color component adder coupled to the resistor for fetching the information about the geometry-processed triangle and the divided upper and lower triangles from the resistor and computing a green component of the color of the geometry-processed triangle and the divided upper and lower triangles, and a blue color component adder coupled to the resistor for fetching the information about the geometry-processed triangle and the divided upper and lower triangles from the resistor and computing a blue component of the color of the geometry-processed triangle and the divided upper and lower triangles.

The resistor stores software-computed values of the X-coordinate of the first vertex, the Y-coordinate of the first vertex, a width on the y-coordinate of the geometry-processed triangle, a width of a span including the first vertex, variations in X-coordinate of the third edge of the geometry-processed triangle, a Y-coordinate of the second vertex of the geometry-processed triangle, variations in width on the X-coordinate of the divided upper triangle, variations in width on the X-coordinate of the divided lower triangle, an initial value of the red component of the first vertex of the geometry-processed triangle, variations in the red component of points on the first edge of the geometry-processed triangle, variation in the red component of the geometry-processed triangle in an X-direction parallel to an X-coordinate axis, an initial value of the green component of the first vertex of the geometry-processed triangle, variations in the green component of points on the first edge of the geometry-processed triangle, variation in the green component of the geometry-processed triangle in the X-direction, an initial value of the blue component of the first vertex of the geometry-processed triangle, variations in the blue component of points on the first edge of the geometry-processed triangle, variation in the blue component of the geometry-processed triangle in the X-direction, the Z-value of the points on the first edge of the geometry-processed triangle and the variations in Z-value in the X-direction.

The X-coordinate initial position adder may comprise a latch circuit for holding a signal of an X-coordinate initial position of the first edge of the triangle, an adder having two input terminals, one of which is coupled to an output terminal of the latch circuit for receipt of an output signal of the X-coordinate initial position from the latch circuit whilst the other is coupled to the resistor for receiving signals of variations in initial position of the first edge of the triangle so that the adder performs operation of adding variations in initial position of the first edge into the X-coordinate initial position, and a selector having two input terminals, one of which is coupled to an output terminal of the adder for receipt of an added value of the X-coordinate initial position from the adder whilst the other is coupled to the resistor for receipt of an initial value of the X-coordinate initial position from the resistor so that the selector performs operation of selecting any of the added value and the initial value of the X-coordinate initial position as well as having an output terminal coupled to an input terminal of the latch circuit.

The X-coordinate width adder may comprise a first selector having two input terminals coupled to the resistor for receipt of signals of variations in width on the X-coordinate of the divided upper and lower triangles so that the first selector performs operation of selecting any of the variations in width on the X-coordinate of the divided upper and lower triangles, a latch circuit for holding a signal of an X-coordinate initial position of the first edge of the triangle, an adder having two input terminals, one of which is coupled to an output terminal of the latch circuit for receipt of an output signal of the X-coordinate initial position from the latch circuit whilst the other is coupled to an output of the first selector for receiving selected one of the variations in width on the X-coordinate of the divided upper and lower triangles so that the adder performs operation of adding the selected one of the variations in width on the X-coordinate of the divided upper and lower triangles into the X-coordinate initial position, and a second selector having two input terminals, one of which is coupled to an output terminal of the adder for receipt of an added value of the X-coordinate initial position from the adder whilst the other is coupled to the resistor for receipt of an initial value of the X-coordinate initial position from the resistor so that the second selector performs operation of selecting any of the added value and the initial value of the X-coordinate initial position as well as having an output terminal coupled to an input terminal of the latch circuit.

Each of the red, green and blue color component adders may comprise a first latch circuit for holding a signal of a Y-coordinate initial position of the first edge of the triangle, a first adder having two input terminals, one of which is coupled to an output terminal of the first latch circuit for receipt of an output signal of the Y-coordinate initial position from the first latch circuit whilst the other is coupled to the resistor for receiving signals of variations in initial position of the first edge of the triangle on the Y-coordinate so that the first adder performs operation of adding variations in initial position of the first edge on the Y-coordinate into the Y-coordinate initial position, a first selector having two input terminals, one of which is coupled to an output terminal of the first adder for receipt of an added value of the Y-coordinate initial position from the first adder whilst the other is coupled to the resistor for receipt of an initial value of the Y-coordinate initial position from the resistor so that the first selector performs operation of selecting any of the added value and the initial value of the Y-coordinate initial position as well as having an output terminal coupled to an input terminal of the first latch circuit, a second latch circuit for holding a signal of an X-coordinate initial position of the first edge of the triangle, a second adder having two input terminals, one of which is coupled to an output terminal of the second latch circuit for receipt of an output signal of the X-coordinate initial position from the second latch circuit whilst the other is coupled to the resistor for receiving signals of variations in initial position of the first edge of the triangle so that the second adder performs operation of adding variations in initial position of the first edge into the X-coordinate initial position, and a second selector having two input terminals, one of which is coupled to an output terminal of the second adder for receipt of an added value of the X-coordinate initial position from the adder whilst the other is coupled to the output terminal of the first selector for receipt of selected one of the added value and the initial value of the Y-coordinate initial position so that the second selector performs operation of selecting either the selected one of the added value and the initial value of the Y-coordinate initial position or the selected one of the added value and the initial value of the X-coordinate initial position as well as having an output terminal coupled to an input terminal of the second latch circuit.

PREFERRED EMBODIMENTS

A first embodiment according to the present invention will be described in detail with reference to FIGS. 2 through 7, wherein there is provided a three-dimensional computer graphic controller provided in a three-dimensional computer graphic system utilizing a priority processing method or a painters algorithm.

Figure 7:
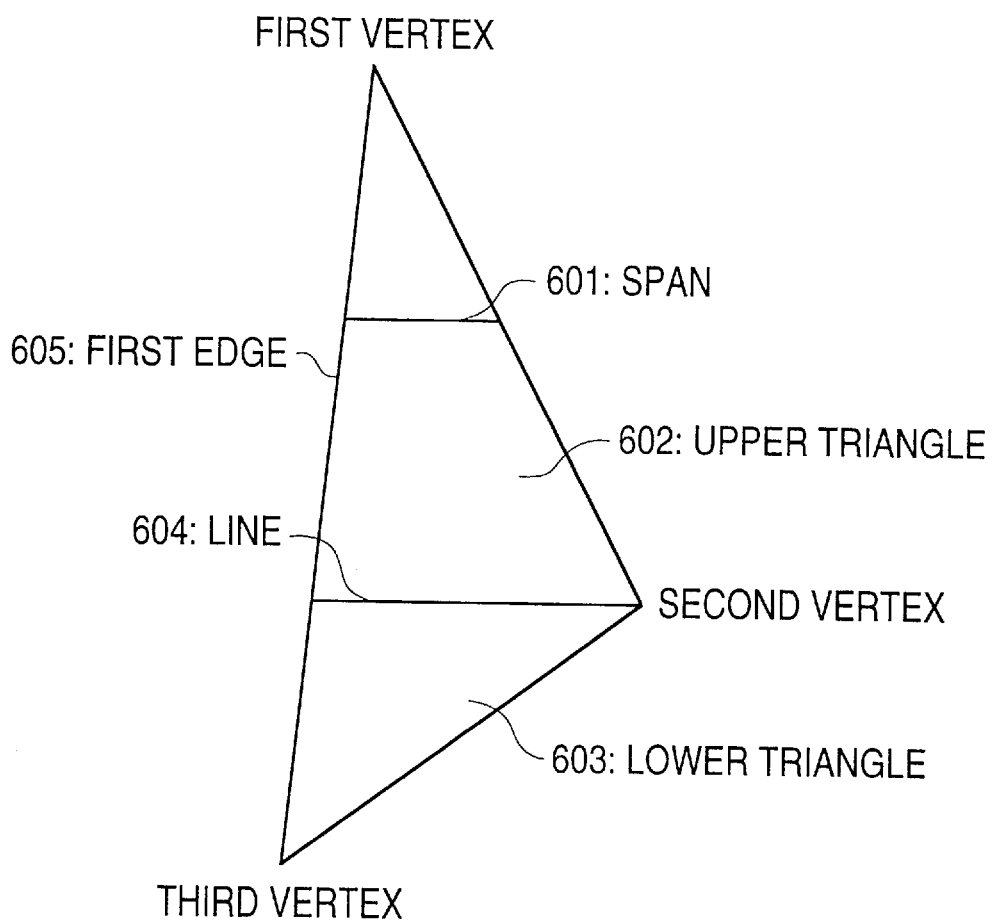
FIG. 7 is a diagram illustrative of a geometry-processed triangle divided into upper and lower triangles for use in subsequent rasterizer processes.

As illustrated in FIG. 7, the polygon is a triangle. A geometry-processed triangle is so set on an X-Y coordinate system that the geometry-processed triangle comprises a first vertex having a highest Y-coordinate value, a second vertex having a lowest Y-coordinate value, a third vertex having an intermediate Y-coordinate value between the highest and lowest Y-coordinate values of the first and a second vertexes, a first edge 605 including the first and second vertexes, a second edge including the second and third vertexes and a third edge including the first and third vertexes, before the geometry-processed triangle is divided by a line 604 parallel to the X-coordinate and extending on the third vertex and across the first edge 605 into a divided upper triangle 602 and a divided lower triangle 603. A span 601 is defined as a line segment extending in parallel to an X-coordinate axis and between the first and second edges of the geometry-processed triangle.

The following data are computed by the software to be stored in a resistor for subsequent use by the hardware in the rasterization processes. As illustrated in FIG. 6, data computed by the software to be stored in a resistor are a start/status flag 501 having an instruction flag to initiate processing by hardware and an end flag indicating that the processing of the triangle is completed, a Y-coordinate 502 of the first vertex, an X-coordinate 503 of the first vertex, a width 504 on the Y-coordinate of the geometry-processed triangle, a width 505 of the span including the first vertex, variations 506 in X-coordinate of the first edge of the geometry-processed triangle, a Y-coordinate 507 of the second vertex of the geometry-processed triangle, variations 508 in width on the X-coordinate of the divided upper triangle, variations 509 in width on the X-coordinate of the divided lower triangle, an initial value 510 of the red component of the first vertex of the geometry-processed triangle, variations 511 in the red component of points on the first edge of the geometry-processed triangle, variation 512 in the red component of the geometry-processed triangle in an X-direction parallel to the X-coordinate axis, an initial value 513 of the green component of the first vertex of the geometry-processed triangle, variations 514 in the green component of points on the first edge of the geometry-processed triangle, variation 515 in the green component of the geometry-processed triangle in the X-direction, an initial value 516 of the blue component of the first vertex of the geometry-processed triangle, variations 517 in the blue component of points on the first edge of the geometry-processed triangle, and variation 518 in the blue component of the geometry-processed triangle in the X-direction.

Figure 2:
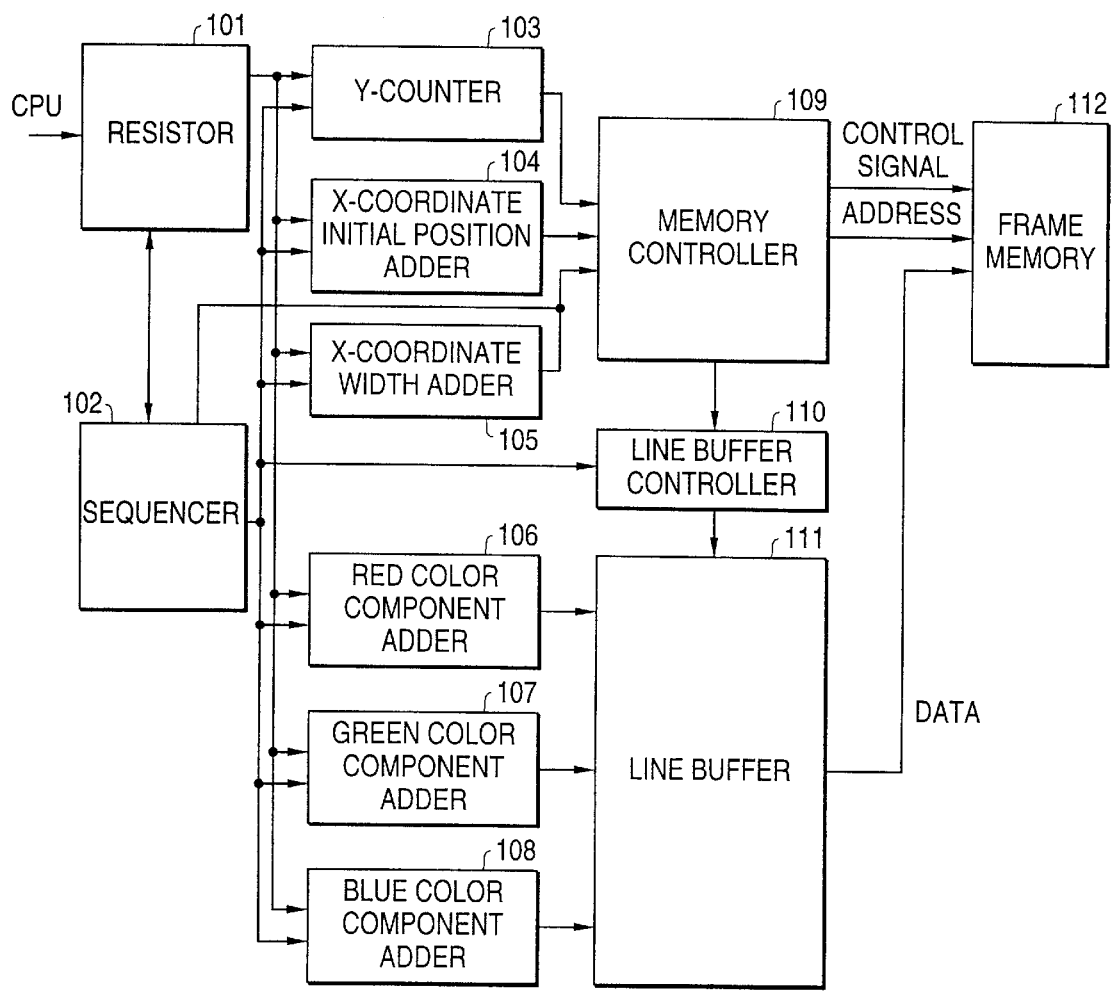
FIG. 2 is a block diagram illustrative of a three-dimensional computer graphic controller provided in a three-dimensional computer graphic system utilizing a priority processing method in a first embodiment according to the present invention.

As illustrated in FIG. 2, the three-dimensional computer graphic controller comprises the following elements. A resistor 101 is provided for receiving information about the geometry-processed triangle and the divided upper and lower triangles from the software and storing the same. A Y-coordinate counter 103 is provided, which is coupled to the resistor 101 for fetching the stored information about the geometry-processed triangle from the resistor 101 and computing Y-coordinates of the triangle. An X-coordinate initial position adder 104 is provided, which is coupled to the resistor 101 for fetching an information about the first edge 605 of the geometry-processed triangle from the resistor 101 and computing an X-coordinate value of an initial position of the first edge 605 of the triangle. An X-coordinate width adder 105 is provided, which is coupled to the resistor 101 for fetching the information about the divided upper and lower triangles 602 and 603 from the resistor 101 and computing individual widths of the divided upper and lower triangles 602 and 603 on the X-coordinate as well as for changing a variation in width on the X-coordinate between the divided upper and lower triangles 602 and 603. A color component adder 106, 107, 108 is provided, which is coupled to the resistor 104 for fetching the information about the geometry-processed triangle and the divided upper and lower triangles 602 ad 603 from the resistor 101 and individually computing red, green and blue components of the color of the geometry-processed triangle and the divided upper and lower triangles 602 and 603. A frame memory controller 108 is provided, which is coupled to the Y-coordinate counter 103, the X-coordinate initial position adder 104 and the X-coordinate width adder 105 for fetching the Y-coordinates of the triangle from the Y-coordinate counter 103, the X-coordinate value of the start position from the X-coordinate initial position adder 104 and the individual widths of the divided upper and lower triangles 602 and 603 on the X-coordinate from the X-coordinate width adder 105 so as to control storing the Y-coordinates of the triangle, the X-coordinate value of the start position and the individual widths of the divided upper and lower triangles 602 and 603 on the X-coordinate into a frame memory 112 coupled to the frame memory controller 109. A line buffer 111 with a capacity corresponding to a line is provided, which is coupled to the color component adder 106, 107, 108 for fetching the red, green and blue components from the color component adder 106, 107, 108 and storing the fetched red, green and blue components therein. A line buffer controller 110 is provided, which is coupled to the line buffer 111 for controlling the line buffer 111. A sequenser 102 is provided, which is coupled to the resistor 101, the Y-coordinate counter 103, the X-coordinate initial position adder 104, the X-coordinate width adder 105, the color component adder 106, 107, 108, the memory controller 109, and the line control buffer 110 for controlling operations of the resistor 101, the Y-coordinate counter 103, the X-coordinate initial position adder 104, the X-coordinate width adder 105, the color component adder 106, 107, 108, the memory controller 109, and the line control buffer 110.

The color component adder 106, 107, 108 comprises the following elements. A red color component adder 106 is provided, which is coupled to the resistor 101 for fetching the information about the geometry-processed triangle and the divided upper and lower triangles 602 and 603 from the resistor 101 and computing a red component of the color of the geometry-processed triangle and the divided upper and lower triangles 602 and 603. A green color component adder 107 is provided which is coupled to the resistor 101 for fetching the information about the geometry-processed triangle and the divided upper and lower triangles 602 and 603 from the resistor 101 and computing a green component of the color of the geometry-processed triangle and the divided upper and lower triangles 602 and 603. A blue color component adder 108 is provided, which is coupled to the resistor 101 for fetching the information about the geometry-processed triangle and the divided upper and lower triangles 602 and 603 a from the resistor 101 and computing a blue component of the color of the geometry-processed triangle and the divided upper and lower triangles 602 and 603.

Figure 3:
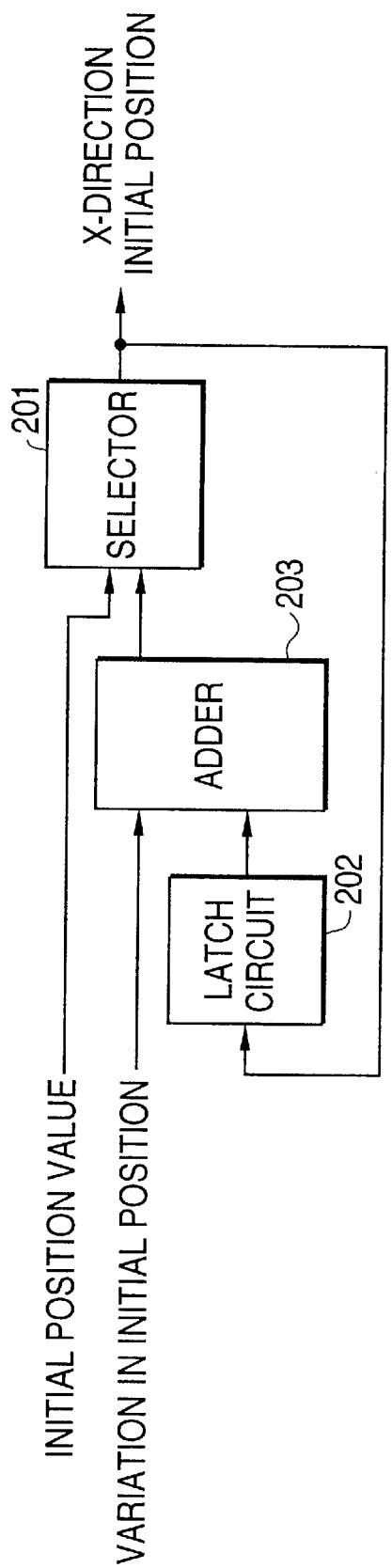
FIG. 3 is a circuit diagram illustrative of an X-coordinate initial position adder provided in a three-dimensional computer graphic controller in a first embodiment according to the present invention.

As illustrated in FIG. 3, the X-coordinate initial position adder 104 comprises the following elements. A latch circuit 202 is provided for holding a signal of an X-coordinate initial position of the first edge 605 of the triangle. An adder 203 is provided, which has two input terminals, one of which is coupled to an output terminal of the latch circuit 202 for receipt of an output signal of the X-coordinate initial position from the latch circuit 202 whilst the other is coupled to the resistor 101 for receiving signals of variations in initial position of the first edge 605 of the triangle so that the adder 203 performs operation of adding variations in initial position of the first edge 605 into the X-coordinate initial position. A selector 201 is provided, which has two input terminals, one of which is coupled to an output terminal of the adder 203 for receipt of an added value of the X-coordinate initial position from the adder 203 whilst the other is coupled to the resistor 101 for receipt of an initial value of the X-coordinate initial position from the resistor 101 so that the selector 201 performs operation of selecting any of the added value and the initial value of the X-coordinate initial position as well as having an output terminal coupled to an input terminal of the latch circuit 202.

Figure 4:
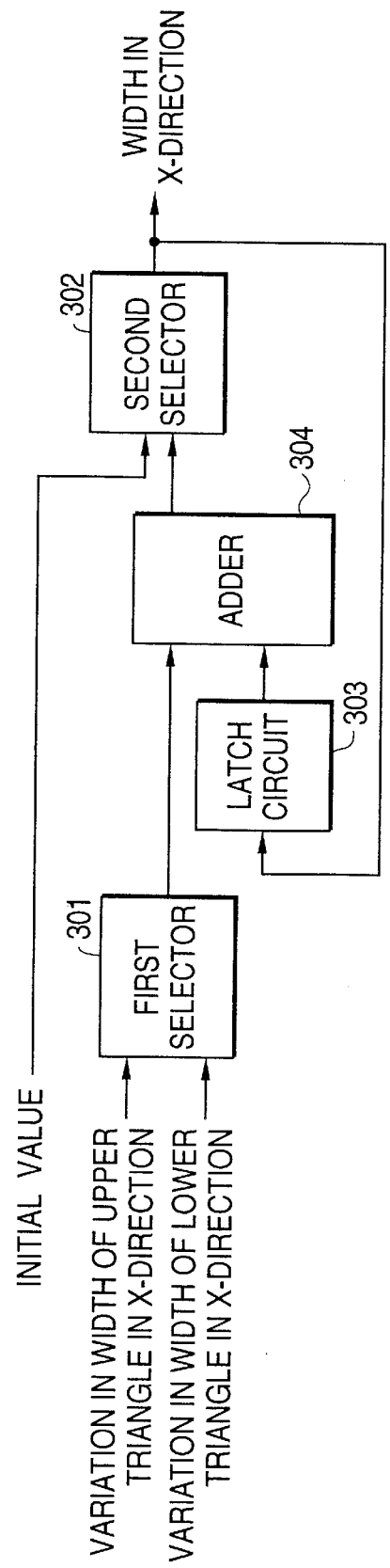
FIG. 4 is a circuit diagram illustrative of an X-coordinate width adder provided in a three-dimensional computer graphic controller in a first embodiment according to the present invention.

As illustrated in FIG. 4, the X-coordinate width adder 105 comprises the following elements. A first selector 301 is provided which has two input terminal coupled to the resistor 101 for receipt of signal of variations in width on the X-coordinate of the divided upper and lower triangles 602 and 603 so that the first selector 301 performs operation of selecting any of the variations in width on the X-coordinate of the divided upper and lower triangles 602 and 603. A latch circuit 303 is provided form holding a signal of an X-coordinate initial position of the first edge 605 of the triangle. An adder 304 is provided which has two input terminals, one of which is coupled to an output terminal of the latch circuit 303 for receipt of an output signal of the X-coordinate initial position from the latch circuit 303 whilst the other is coupled to an output of the first selector 301 for receiving selected one of the variations in width on the X-coordinate of the divided upper and lower triangles 602 and 603 so that the adder 304 performs operation of adding the selected one of the variations in width on the X-coordinate of the divided upper and lower triangles 602 and 603 into the X-coordinate initial position. A second selector 302 is provided which has two input terminals, one of which is coupled to an output terminal of the adder for receipt of an added value of the X-coordinate initial position from the adder 304 whilst the other is coupled to the resistor 101 for receipt of an initial value of the X-coordinate initial position from the resistor 101 so that the second selector 302 performs operation of selecting any of the added value and the initial value of the X-coordinate initial position as well as having an output terminal coupled to an input terminal of the latch circuit 303.

Figure 5:
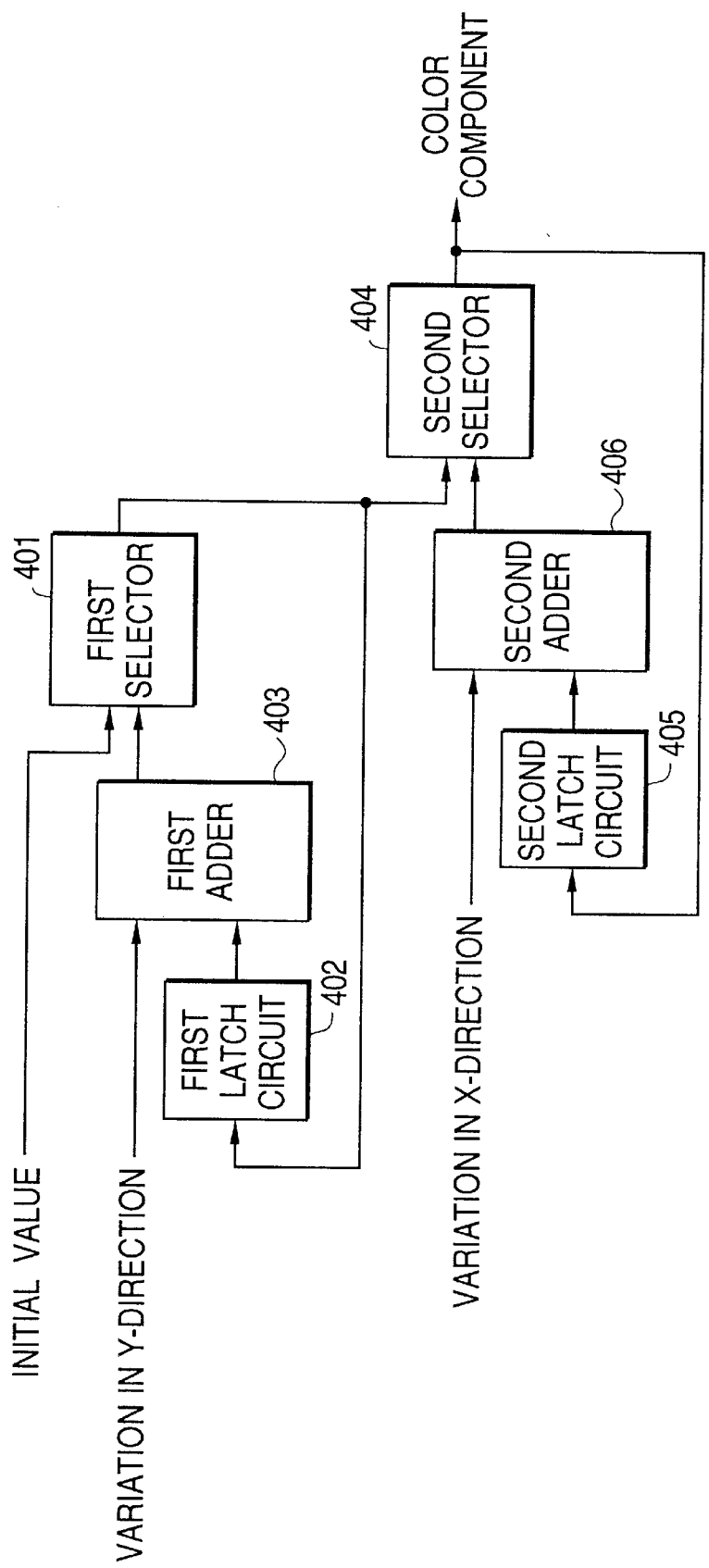
FIG. 5 is a circuit diagram illustrative of a color component adder provided in a three-dimensional computer graphic controller in a first embodiment according to the present invention.

As illustrated in FIG. 5, each of the red, green and blue color component adders comprises the following elements. A first latch circuit 402 is provided for holding a signal of a Y-coordinate initial position of the first edge 605 of the triangle. A first adder 502 is provided which has two input terminals, on of which is coupled to an output terminal of the first latch circuit 402 for receipt of an output signal of the Y-coordinate initial position from the first latch circuit 402 whilst the other is coupled to the resistor 101 for receiving signals of variations in initial position of the first edge 605 of the triangle on the Y-coordinate so that the first adder 403 performs operation of adding variations in initial position of the first edge on the Y-coordinate into the Y-coordinate initial position. A first selector 401 is provided which has two input terminals, one of which is coupled to an output terminal of the first adder 403 for receipt of an added value of the Y-coordinate initial position from the first adder 403 whilst the other is coupled to the resistor for receipt of an initial value of the Y-coordinate initial position from the resistor 101 so that the first selector 401 performs operation of selecting any of the added value and the initial value of the Y-coordinate initial position as well as having an output terminal coupled to an input terminal of the first latch circuit 402. A second latch circuit 405 is provided for holding a signal of an X-coordinate initial position of the first edge 605 of the triangle. A second adder 406 is provided which has two input terminals, one of which is coupled to an output terminal of the second latch circuit 504 for receipt of an output signal of the X-coordinate initial position from the second latch circuit 405 whilst the other is coupled to the resistor 101 for receiving signals of variations in initial position of the first edge 605 of the triangle so that the second adder 406 performs operation of adding variations in initial position of the first edge 605 into the X-coordinate initial position. A second selector 404 is provided which has two input terminals, one of which is coupled to an output terminal of the second adder 406 for receipt of an added value of the X-coordinate initial position from the second adder 406 whilst the other is coupled to the output terminal of the first selector 401 for receipt of selected one of the added value and the initial value of the Y-coordinate initial position so that the second selector 404 performs operation of selecting either the selected one of the added value and the initial value of the Y-coordinate initial position or the selected one of the added value and the initial value of the X-coordinate initial position as well as having an output terminal coupled to an input terminal of the second latch circuit 405.

The basic algorithm of the three-dimensional computer graphic processing comprises a geometry accelerator and a subsequent rasterizer. The geometry accelerator includes a conversion into a visual field coordinate system, a writing, a conversion coordinate system, a clipping, and a conversion of a window coordinate system whereby the coordinates and the color components of the first, second and third vertexes of the triangle are calculated by the software, based upon which calculations are made to obtain and set in the resistor 101 variations 506 in X-coordinate of the first edge 605 of the geometry-processed triangle, variations 508 in width on the X-coordinate of the divided upper triangle, variations 509 in width on the X-coordinate of the divided lower triangle, variations 511 in the red component of points on the first edge of the geometry-processed triangle, variation 512 in the red component of the geometry-processed triangle in an X-direction parallel to the X-coordinate axis, variations 514 in the green component of points on the first edge of the geometry-processed triangle, variation 515 in the green component of the geometry-processed triangle in the X-direction, variations 517 in the blue component of points on the first edge of the geometry-processed triangle, and variation 518 in the blue component of the geometry-processed triangle in the X-direction. Also set in the resistor 101 along with the above values are a Y-coordinate 502 of the first vertex, an X-coordinate 503 of the first vertex, a width 504 on the Y-coordinate of the geometry-processed triangle, a width 505 of the span including the first vertex, a Y-coordinate 507 of the second vertex of the geometry-processed triangle, an initial value 510 of the red component of the first vertex of the geometry-processed triangle, an initial value 513 of the green component of the first vertex of the geometry-processed triangle, and an initial value 516 of the blue component of the first vertex of the geometry-processed triangle. Finally, a start/status flag 501 is set in the resistor wherein the start/status flag 501 has an instruction flag to initiate processing by hardware and an end flag indicating that the processing of the triangle is completed.

The subsequent processes for rasterization will be made by the hardware based upon the above data calculated by the software.

First, when the processing initiation flag is set in the resistor 101, the sequenser 102 feeds the Y-coordinate 502 of the first vertex into the Y-counter 103. The selector 201 in the X-coordinate initial position adder 104 selects the initial value 503 of X-coordinate of the first vertex. The latch circuit 202 in the X-coordinate initial position adder 104 latches the initial value 503 of X-coordinate of the first vertex. If the Y-coordinate 502 of the first vertex is different from the Y-coordinate 507 of the second vertex of the geometry-processed triangle, then the selector 301 in the X-coordinate width adder 105 selects the variations 508 in width on the X-coordinate of the divided upper triangle. If however, the Y-coordinate 502 of the first vertex is the same as the Y-coordinate 507 of the second vertex of the geometry-processed triangle, then the first selector 301 in the X-coordinate width adder 105 selects the variations 509 in width on the X-coordinate of the divided lower triangle. The second selector 302 in the X-coordinate width adder 105 selects an initial value of the width 505 of the span including the first vertex and the latch circuit 303 latches the initial value of the width 505 of the span including the first vertex. The first selector 401 in the red color component adder 106 selects the initial value 510 of the red component of the first vertex of the geometry-processed triangle. The first latch circuit 402 latches the initial value 510 of the red component of the first vertex of the geometry-processed triangle. The second selector in the red color component adder 106 selects the selected value by the first selector 401 and the second latch circuit latches the selected value. The first selector 401 in the green color component adder 107 selects the initial value 510 of the red component of the first vertex of the geometry-processed triangle. The first latch circuit 401 latches the initial value 510 of the red component of the first vertex of the geometry-processed triangle. The second selector in the green color component adder 107 selects the selected value by the first selector 401 and the second latch circuit latches the selected value. The first selector 401 in the blue color component adder 108 selects the initial value 510 of the red component of the first vertex of the geometry-processed triangle. The first latch circuit 402 latches the initial value 510 of the red component of the first vertex of the geometry-processed triangle. The second selector in the blue color component adder 108 selects the selected value by the first selector 401 and the second latch circuit latches the selected value.

As a result, the red color component adder 106, the green color component adder 107 and the blue color component adder 108 have already output an initial pixel color of the span 601. The value of the initial pixel color of the span 601 is stored in the line buffer 111 before the second selector 404 in the red color component adder 106, the green color component adder 107 and the blue color component adder 108 switches to select the output from the second adder 406.

If the width of the triangle on the X-coordinate indicated by the X-coordinate width adder 105 is one pixel, the process of the spanning the X-direction has been completed. If, however, the width of the triangle on the X-coordinate indicated by the X-coordinate width adder 105 is not one pixel, the sequenser 102 repeats the following processes plural times corresponding to the number smaller by one than the pixels of the width. The second adder 406 in the red color component adder 106, the green color component adder 107 and the blue color component adder 108 adds the output from the first latch circuit 402 to the variations in initial position of the first edge 605 and output the added value. The sequenser 102 instructs the line buffer controller 110 to write the output value of the second adder 406 into the line buffer 111.

After the processing of the one span has been completed, then the sequenser 102 instructs the memory controller 109 to fetch the data stored in the line buffer 111 from a writing initiation position indicated by the value from the Y-counter 103 and the X-coordinate initial position adder 104 for the pixel number indicated by the X-coordinate width adder 105 and then feed the data to the frame memory 112 to write the data into the frame memory. Thereafter, the sequenser 102 makes a decrement of the counting value of the Y-counter 103. The sequenser 102 causes the adder 203 in the X-coordinate initial position adder 104 to perform operation of adding variations in initial position of the first edge 605 into the X-coordinate initial position latched in the latch circuit 201. The sequenser 102 causes the adder 304 to perform operation of adding the selected one of the variations in width on the X-coordinate of the divided upper and lower triangles 602 and 603 into the value latched in the latch circuit 303. The second selector 404 in the red color component adder 106, the green color component adder 107 and the blue color component adder 108 switches to select the output value from the first selector 401. The second latch circuit 405 latches the selected value by the second selector 404.

During the above process, the value of the Y-counter 103 reaches the Y-coordinate of the third vertex 507 of the triangle. At this time, the sequenser 102 causes the selector 301 in the X-coordinate width adder 105 to switch to select the variations 509 in width on the X-coordinate of the divided lower triangle.

The above processes will be repeated plural times corresponding to the width of the triangle in the Y-direction.

If the first and third vertexes of the triangle have the same Y-coordinate, then in the initialization process the variations 509 in width on the X-coordinate of the divided lower triangle are selected.

A second embodiment according to the present invention will be described in detail with reference to FIGS. 3, 4, 5, 7, 8 and 9, wherein there is provided a three-dimensional computer graphic controller provided in a three-dimensional computer graphic system utilizing a Z-buffer method.

As illustrated in FIG. 7, the polygon is a triangle. A geometry-processed triangle is so set on an X-Y coordinate system that the geometry-processed triangle comprises a first vertex having a highest Y-coordinate value, a second vertex having a lowest Y-coordinate value, a third vertex having an intermediate Y-coordinate value between the highest and lowest Y-coordinate values of the first and second vertexes, a first edge 605 including the first and second vertexes, a second edge including the second and third vertexes and a third edge including the first and third vertexes, before the geometry-processed triangle is divided by a line 604 parallel to the X-coordinate and extending on the third vertex and across the first edge 605 into a divided upper triangle 602 and a divided lower triangle 603. A span 601 is defined as a line segment extending in parallel to an X-coordinate axis and between the first and second edges of the geometry-processed triangle.

The following data are computed by the software to be stored in a resistor for subsequent use by the hardware in the rasterization processes. As illustrated in FIG. 9, data computed by the software to be stored in a resistor are a start/status flag 802 having an instruction flag to initiate processing by hardware and an end flag indicating that the processing of the triangle is completed, the X-coordinate 802 of the first vertex, the Y-coordinate 803 of the first vertex, a width 804 on the y-coordinate of the geometry-processed triangle, a width 805 of a span including the first vertex, variations 806 in X-coordinate of the third edge of the geometry-processed triangle, a Y-coordinate 807 of the second vertex of the geometry-processed triangle variations 808 in width on the X-coordinate of the divided upper triangle, variations 809 in width on the X-coordinate of the divided lower triangle, an initial value 810 of the red component of the first vertex of the geometry-processed triangle, variations 811 in the red component of points on the first edge of the geometry-processed triangle, variation 812 in the red component of the geometry-processed triangle in an X-direction parallel to an X-coordinate axis, an initial value 813 of the green component of the first vertex of the geometry-processed triangle, variation 814 in the green component of points on the first edge of the geometry-processed triangle, variation 815 in the green component of the geometry-processed triangle in the X-direction, an initial value 816 of the blue component of the first vertex of the geometry-processed triangle, variations 817 in the blue component of points on the first edge of the geometry-processed triangle, variation 818 in the blue component of the geometry-processed triangle in the X-direction, the Z-value 819 of the first vertex of the geometry-processed triangle, the variations 820 in Z-value of the points on the first edge of the geometry-processed triangle and the variations 821 in Z-value in the X-direction.

Figure 8:
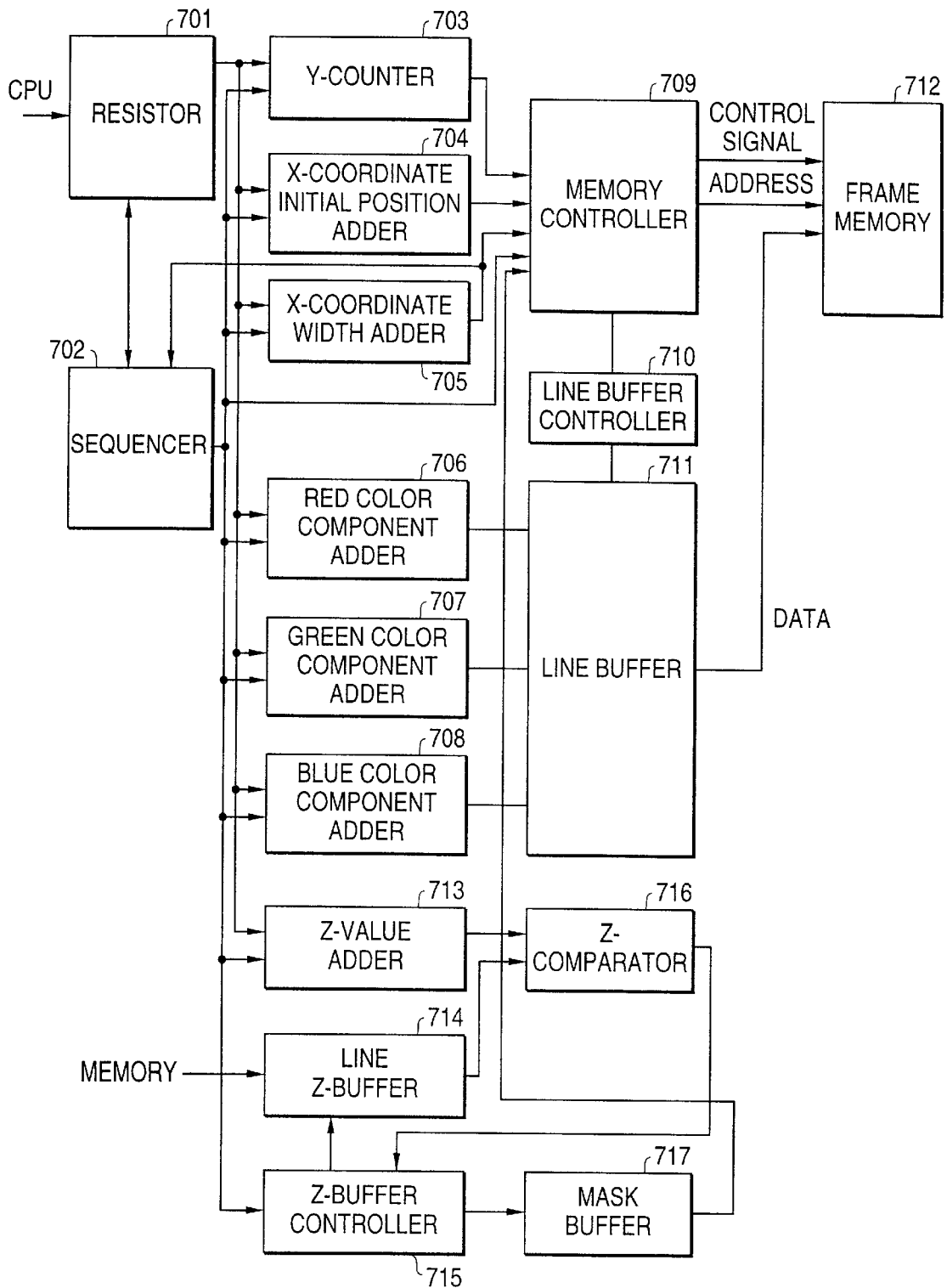
FIG. 8 is a block diagram illustrative of a three-dimensional computer graphic controller provided in a three-dimensional computer graphic system utilizing a priority processing method in a second embodiment according to the present invention.

As illustrated in FIG. 8, the three-dimensional computer graphic controller comprises he following elements. A resistor 701 is provided for receiving information about the geometry-processed triangle and the divided upper and lower triangles 602 and 603 and storing the same. A Y-coordinate counter 703 is provided which is coupled to the resistor 701 for fetching the stored information about the geometry-processed triangle from the resistor 701 and computing Y-coordinates of the triangle. An X-coordinate initial position adder 704 is provided which is coupled to the resistor 701 for fetching an information about the first edge 605 of the geometry-processed triangle from the resistor 703 and computing an X-coordinate value of an initial position of the first edge 605 of the triangle. An X-coordinate width adder 705 is provided which is coupled to the resistor 701 for fetching the information about the divided upper and lower triangles 602 and 603 from the resistor 705 and computing individual widths of the divided upper and lower triangles 602 and 603 on the X-coordinate as well as for changing a variation in width on the X-coordinate between the divided upper and lower triangles 602 and 603. A color component adder 706, 706, 708 is provided which is coupled to the resistor 701 for fetching the information about the geometry-processed triangle and the divided upper and lower triangles 602 and 603 from the resistor 701 and individually computing red, green and blue components of the color of the geometry-processed triangle and the divided upper and lower triangles 602 and 603. A frame memory controller 709 is provided which is coupled to the Y-coordinate counter 703, the X-coordinate initial position adder 704 and the X-coordinate width adder 705 for fetching the Y-coordinates of the triangle from the Y-coordinate counter 703, the X-coordinate value of the start position from the X-coordinate initial position adder 704 and the individual widths of the divided upper and lower triangles on the X-coordinate from the X-coordinate width adder 705 so as to control storing the Y-coordinates of the triangle, the X-coordinate value of the start position and the individual widths of the divided upper and lower triangles 602 and 603 on the X-coordinate into a frame memory 712 coupled to the frame memory controller 709. A line buffer 711 with a capacity corresponding to a line is provided, which is coupled to the color component adder 706, 707, 708 for fetching the red, green and blue components from the color component adder and storing the fetched red, green and blue components therein. A Z-value adder 713 is provided which is coupled to said resistor 701 for receipt of a Z-value of the first vertex of the geometry-processed triangle, variations in Z-value of points on the first edge 605 of the geometry-processed triangle and variations in Z-value in an X-direction parallel to an X-coordinate axis and computing Z-values of an object. A Z-buffer 714 is provided which has a capacity corresponding to one line and is coupled to the frame memory 712 for fetching Z-buffer data from the frame memory 712 and storing the Z-buffer data therein. A Z-buffer controller 715 is provided which is coupled to the Z-buffer for controlling the Z-buffer 714. A Z-comparator 716 is provided which is coupled to the Z-value adder 713 and the Z-buffer 714 for comparing the stored Z-buffer data with the computed Z-values of the object. A mask buffer 717 is provided which is coupled via the Z-buffer controller 715 and the Z-comparator 716 to the Z-value adder 713 and also coupled to the memory controller 709 for storing one bit information to be supplied to the memory controller 709 so that according to the one bit information the memory controller 709 controls the frame memory 712 to store the computed Z-values of the object when the computed Z-value from the Z-value adder 713 is more distant from the viewpoint than the Z-buffer data stored in the Z-buffer 714. A line buffer controller 710 is provided which is coupled to the line buffer 711 for controlling the line buffer 711. A sequenser 702 is provided which is coupled to the resistor 701, the Y-coordinate counter 703, the X-coordinate initial position adder 704, the X-coordinate width adder 705, the color component adder 706, 707, 708, the Z-value adder 713, the memory control 709 and the Z-buffer controller 715 for controlling the resistor 701, the Y-coordinate counter 703, the X-coordinate initial position adder 704, the X-coordinate width adder 705, the color component adder 706, 707, 709, the Z-value adder 713, the memory controller 709 and the Z-buffer controller 715.

The color component adder 706, 707, 708 comprises the following elements. A red color component adder 706 is provided which is coupled to the resistor 701 for fetching the information about the geometry-processed triangle and the divided upper and lower triangles 602 and 603 from the resistor 601 and computing a red component of the color of the geometry-processed triangles and the divided upper and lower triangles 602 and 603. A green color component adder 707 is provided which is coupled to the resistor 701 for fetching the information about the geometry-processed triangle and the divided upper and lower triangles 602 and 603 from the resistor 701 and computing a green component of the color of the geometry-processed triangle and the divided upper and lower triangles 602 and 603. A blue color component adder 708 is provided which is coupled to the resistor 701 for fetching the information about the geometry-processed triangle and the divided upper and lower triangles 602 and 603 from the resistor 701 and computing a blue component of the color of the geometry-processed triangle and the divided upper and lower triangles 602 and 603.

As illustrated in FIG. 3, the X-coordinate initial position adder 704 comprises the following elements. A latch circuit 202 is provided for holding a signal of an X-coordinate initial position of the first edge 605 of the triangle. An adder 203 is provided, which has two input terminals, one of which is coupled to an output terminal of the latch circuit 202 for receipt of an output signal of the X-coordinate initial position from the latch circuit 202 whilst the other is coupled to the resistor 701 for receiving signals of variations in initial position of the first edge 605 of the triangle so that the adder 203 performs operation of adding variations in initial position of the first edge 605 into the X-coordinate initial position. A selector 201 is provided, which has two input terminals, one of which is coupled to an output terminal of the adder 203 for receipt of an added value of the X-coordinate initial position from the adder 203 whilst the other is coupled to the resistor 701 for receipt of an initial value of the X-coordinate initial position from the resistor 701 so that the selector 201 performs operation of selecting any of the added value and the initial value of the X-coordinate initial position as well as having an output terminal coupled to an input terminal of the latch circuit 202.

As illustrated in FIG. 4, the X-coordinate width adder 705 comprises the following elements. A first selector 301 is provided which has two input terminals coupled to the resistor 701 for receipt of signals of variations in width on the X-coordinate of the divided upper and lower triangles 602 and 603 so that the first selector 301 performs operation of selecting any of the variations in width on the X-coordinate of the divided upper and lower triangles 602 and 603. A latch circuit 303 is provided for holding a signal of an X-coordinate initial position of the first edge 605 of the triangle. An adder 304 is provided which has two input terminals, one of which is coupled to an output terminal of the latch circuit 303 for receipt of an output signal of the X-coordinate initial position from the latch circuit 303 whilst the other is coupled to an output of the first selector 301 for receiving selected one of the variations in width on the X-coordinate of the divided upper and lower triangles 602 and 603 so that the adder 304 performs operation of adding the selected one of the variations in width on the X-coordinate of the divided upper and lower triangles 602 and 603 into the X-coordinate initial position. A second selector 302 is provided which has two input terminals, one of which is coupled to an output terminal of the adder for receipt of an added value of the X-coordinate initial position from the adder 304 whilst the other is coupled to the resistor 701 for receipt of an initial value of the X-coordinate initial position from the resistor 701 so that the second selector 302 performs operation of selecting any of the added value and the initial value of the X-coordinate initial position as well as having an output terminal coupled to an input terminal of the latch circuit 303.

As illustrated in FIG. 5, each of the red, green and blue color component adders 706, 707, 708 comprises the following elements. A first latch circuit 402 is provided for holding a signal of a Y-coordinate initial position of the first edge 605 of the triangle. A first adder 403 is provided which has two input terminals, one of which is coupled to an output terminal of the first latch circuit 402 for receipt of an output signal of the Y-coordinate initial position from the first latch circuit 402 whilst the other is coupled to the resistor 701 for receiving signals of variations in initial position of the first edge 605 of the triangle on the Y-coordinate so that the first adder 403 performs operation of adding variations in initial position of the first edge 605 on the Y-coordinate into the Y-coordinate initial position. A first selector 401 is provided which has two input terminals, one of which is coupled to an output terminal of the first adder 403 for receipt of an added value of the Y-coordinate initial position from the first adder 403 whilst the other is coupled to the resistor 701 for receipt of an initial value of the Y-coordinate initial position from the resistor 701 so that the first selector 401 performs operation of selecting any of the added value and the initial value of the Y-coordinate initial position as well as having an output terminal coupled to an input terminal of the first latch circuit 402. A second latch circuit 405 is provided for holding a signal of an X-coordinate initial position of the first edge 605 of the triangle. A second adder 406 is provided which has two input terminals, one of which is coupled to an output terminal of the second latch circuit 405 for receipt of an output signal of the X-coordinate initial position from the second latch circuit 405 whilst the other is coupled to the resistor 701 for receiving signals of variations in initial position of the first edge 605 of the triangle so that the second adder 406 performs operation of adding variations in initial position of the first edge 605 into the X-coordinate initial position. A second selector 404 is provided which has two input terminals, one of which is coupled to an output terminal of the second adder 406 for receipt of an added valued of the X-coordinate initial position from the second adder 406 whilst the other is coupled to the output terminal of the first selector 401 for receipt of selected one of the added value and the initial value of the Y-coordinate initial position so that the second selector 404 performs operation of selecting either the selected one of the added value and the initial value of the Y-coordinate initial position or the selected one of the added value and the initial value of the X-coordinate initial position as well as having an output terminal coupled to an input terminal of the second latch circuit 405.

The basic algorithm of the three-dimensional computer graphic processing comprises a geometry accelerator and a subsequent rasterizer. The geometry accelerator includes a conversion into a visual field coordinate system, a writing, a conversion coordinate system, a clipping, and a conversion of a window coordinate system whereby the coordinates and the color components of the first, second and third vertexes of the triangle are calculated by the software, based upon which calculations are made to obtain and set in the resistor 701 variations 806 in X-coordinate of the third edge of the geometry-processed triangle, variations 808 in width on the X-coordinate of the divided upper triangle, variations 809 in width on the X-coordinate of the divided lower triangle, variations 811 in the red component of points on the first edge of the geometry-processed triangle, variation 812 in the red component of the geometry-processed triangle in an X-direction parallel to an X-coordinate axis, variations 814 in the green component of points on the first edge of the geometry-processed triangle, variation 815 in the green component of the geometry-processed triangle in the X-direction, variations 817 in the blue component of points on the first edge of the geometry-processed triangle, variation 818 in the blue component of the geometry-processed triangle in the X-direction, the variations 820 in Z-value of the points on the first edge of the geometry-processed triangle and the variations 821 in Z-value in the X-direction. Also set in the resistor 701 along with the above data are the X-coordinate 802 of the first vertex, the Y-coordinate 803 of the first vertex, a width 804 on the y-coordinate of the geometry-processed triangle, a width 805 of a span including the first vertex, a Y-coordinate 807 of the second vertex of the geometry-processed triangle, an initial value 810 of the red component of the first vertex of the geometry-processed triangle, an initial value 813 of the green component of the first vertex of the geometry-processed triangle, an initial value 816 of the blue component of the first vertex of the geometry-processed triangle, the Z-value 819 of the first vertex of the geometry-processed triangle. Finally, a start/status flag 801 is set in the resistor 701 wherein the start/status flag 801 has an instruction flag to initiate processing by hardware and an end flag indicating that the processing of the triangle is completed.

The subsequent processes for rasterization will be made by the hardware based upon the above data calculated by the software.

First, when the processing initiation flag is set in the resistor 701, the sequenser 702 feeds the Y-coordinate 802 of the first vertex into the Y-counter 703. The selector 201 in the X-coordinate initial position adder 704 selects the initial value 803 of X-coordinate of the first vertex. The latch circuit 202 in the X-coordinate initial position adder 704 latches the initial value 803 of X-coordinate of the first vertex. If the Y-coordinate 802 of the first vertex is different from the Y-coordinate 807 of the second vertex of the geometry-processed triangle, then the selector 301 in the X-coordinate width adder 705 selects the variations 808 in width on the X-coordinate of the divided upper triangle. If, however, the Y-coordinate 802 of the first vertex is the same as the Y-coordinate 807 of the second vertex of the geometry-processed triangle, then the first selector 301 in the X-coordinate width adder 705 selects the variations 809 in width on the X-coordinate of the divided lower triangle. The second selector 302 in the X-coordinate width adder 705 selects an initial value of the width 805 of the span including the first vertex and the latch circuit 303 latches the initial value of the width 805 of the span including the first vertex. The first selector 401 in the red color component adder 706 selects the initial value 810 of the red component of the first vertex of the geometry-processed triangle. The first latch circuit 402 latches the initial value 810 of the red component of the first vertex of the geometry-processed triangle. The second selector in the red color component adder 706 selects the selected value by the first selector 401 and the second latch circuit latches the selected value. The first selector 401 in the green color component adder 707 selects the initial value 810 of the red component of the first vertex of the geometry-processed triangle. The first latch circuit 402 latches the initial value 810 of the red component of the first vertex of the geometry-processed triangle. The second selector in the green color component adder 707 selects the selected value by the first selector 401 and the second latch circuit latches the selected value. The first selector 401 in the blue color component adder 708 selects the initial value 810 of the red component of the first vertex of the geometry-processed triangle. The first latch circuit 402 latches the initial value 810 of the red component of the first vertex of the geometry-processed triangle. The second selector in the blue color component adder 708 selects the selected value by the first selector 401 and the second latch circuit latches the selected value. The first selector 401 in the Z-value adder 713 selects the initial value 810 of the red component of the first vertex of the geometry-processed triangle. The first latch circuit 402 latches the initial value 810 of the red component of the first vertex of the geometry-processed triangle. The second selector in the Z-value adder 713 selects the selected value by the first selector 401 and the second latch circuit latches the selected value.

Subsequently, the sequenser 702 instructs the memory controller 709 to fetch the Z-value from the Z-buffer of the frame memory 712 for the pixel number indicated by the X-coordinate width adder 705 from a writing initiation position indicated by the value from the Y-counter 103 and the X-coordinate initial position adder 104. The buffer controller 715 synchronizes with the memory controller 709 to write the fetched Z-value into the Z-buffer 714.

As a result, the red color component adder 706, the green color component adder 707 and the blue color component adder 708 have already output an initial pixel color of the span 601. The value of the initial pixel color of the span 601 is stored in the line buffer 711 and simultaneously the Z-comparator 716 compares the stored Z-buffer data in the line Z-buffer 714 with the computed Z-values of the object from the Z-value adder 713. As a result of this comparison, if the computed Z-values of the object from the Z-value adder 713 is more distant from the viewpoint than the Z-buffer data from the line Z-buffer 714, then a bit is set as a corresponding position in the mask buffer 717. If, however, the computed Z-values of the object from the Z-value adder 713 is not more distant from the viewpoint than the Z-buffer data from the line Z-buffer 714, then corresponding position in the mask buffer 717 is cleared. Further, the second selector 404 in the red color component adder 706, the green color component adder 707, the blue color component adder 708 and the Z-value adder 713 switches to select the output from the second adder 406.

If the width of the triangle on the X-coordinate indicated by the X-coordinate width adder 705 is one pixel, then the process of the span in the X-direction has been completed. If, however, the width of the triangle on the X-coordinate indicated by the X-coordinate width adder 705 is not one pixel, the sequenser 702 repeats the following processes plural times corresponding to the number smaller by one than the pixels of the width. The second adder 406 in the red color component adder 706, the green color component adder 707 and the blue color component adder 708 adds the output from the second latch circuit 405 to the variations in initial position of the first edge 605 and output the added value. The sequenser 702 instructs the line buffer controller 710 to write the output value of the second adder 406 into the line buffer 711.

After the processing of the one span has been completed, then the sequenser 702 instructs the memory controller 709 to fetch the data stored in the line buffer 711 from a writing initiation position indicated by the value from the Y-counter 703 and the X-coordinate initial position adder 704 for the pixel number indicated by the X-coordinate width adder 705 and then feed the data to the frame memory 712 to write the data into the frame memory. No data is written of the pixel at which a mask bit of the mask buffer 717 is set. Thereafter, the sequenser 702 makes a decrement of the counting value of the Y-counter 703. The sequenser 702 causes the adder 203 in the X-coordinate initial position adder 704 to perform operation of adding variations in initial position of the first edge 605 into the X-coordinate initial position latched in the latch circuit 201. The sequenser 702 causes the adder 304 in the X-coordinate width adder 705 to perform operation of adding the selected one of the variations in width on the X-coordinate of the divided upper and lower triangles 602 and 603 into the value latched in the latch circuit 303. The second selector 404 in the red color component adder 706, the green color component adder 707, the blue color component adder 708 and the Z-value adder 713 switches to select the output value from the first selector 401. The second latch circuit 405 latches the selected value by the second selector 404.

During the above process, the value of the Y-counter 703 reaches the Y-coordinate of the third vertex 807 of the triangle. At this time, the sequenser 702 causes the selector 301 in the X-coordinate width adder 705 to switch to select the variations 809 in width on the X-coordinate of the divided lower triangle.

The above processes will be repeated plural times corresponding to the width of the triangle in the Y-direction.

If the first and third vertexes of the triangle have the same Y-coordinate, then in the initialization process the variations 809 in width on the X-coordinate of the divided lower triangle are selected.

Whereas modifications of the present invention will be apparent o a person having ordinary skill in the art, to which the invention pertains, it is to be understood that embodiments as shown and described by way of illustrations are by no means intended to be considered in a limiting sense. Accordingly, it is to be intended to cover by claims any modifications of the present invention which fall within the spirit and scope of the present invention.

What is claimed is:

1. A three-dimensional computer graphic controller provided in a three-dimensional computer graphic system utilizing a priority processing method, wherein a geometry-processed triangle is so set on an X-Y coordinate system that the geometry-processed triangle comprises a first vertex having a highest Y-coordinate value, a second vertex having a lowest Y-coordinate value, a third vertex having an intermediate Y-coordinate value between the highest and lowest Y-coordinate values of the first and second vertexes, a first edge including the first and second vertexes, a second edge including the second and third vertexes and a third edge including the first and third vertexes, before the geometry-processed triangle is divided by a line parallel to the X-coordinate and extending on the third vertex and across the first edge into a divided upper triangle and a divided lower triangle, said three-dimensional computer graphic controller comprises:

a resistor for receiving information about the geometry-processed triangle and the divided upper and lower triangles and storing the same;

a Y-coordinate counter coupled to the resistor for fetching the stored information about the geometry-processed triangle from the resistor and computing Y-coordinates of the triangle;

an X-coordinate initial position adder coupled to the resistor for fetching an information about the first edge of the geometry-processed triangle from the resistor and computing an X-coordinate value of an initial position on the first edge of the triangle;

an X-coordinate width adder coupled to the resistor for fetching the information about the divided upper and lower triangles from the resistor and computing individual widths of the divided upper and lower triangles on the X-coordinate as well as for changing a variation in width on the X-coordinate between the divided upper and lower triangles;

a color component adder coupled to the resistor for fetching the information about the geometry-processed triangle and the divided upper and lower triangles from the resistor and individually computing red, green and blue components of the color of the geometry-processed triangle and the divided upper and lower triangles;

a frame memory controller coupled to the Y-coordinate counter, the X-coordinate initial position adder and the X-coordinate width adder for fetching the Y-coordinates of the triangle from the Y-coordinate counter, the X-coordinate value of the start position from the X-coordinate initial position adder and the individual widths of the divided upper and lower triangles on the X-coordinate from the X-coordinate width adder so as to control storing the Y-coordinates of the triangle, the X-coordinate value of the start position and the individual widths of the divided upper and lower triangles on the X-coordinate into a frame memory coupled to the frame memory controller; and a line buffer with a capacity corresponding to a line and being coupled to the color component adder for fetching the red, green and blue components from the color component adder and storing the fetched red, green and blue components therein.

2. The three-dimensional computer graphic controller as claimed in claim 1, further comprising a line buffer controller coupled to the line buffer for controlling the line buffer.

3. The three-dimensional computer graphic controller as claimed in claim 1, further comprising a sequenser for controlling the resistor, the Y-coordinate counter, X-coordinate initial position adder, the X-coordinate width adder and the color component adder.

4. The three-dimensional computer graphic controller as claimed in claim 3, wherein the color component adder comprises:

a red color component adder coupled to the resistor for fetching the information about the geometry-processed triangle and the divided upper and lower triangles from the resistor and computing a red component of the color of the geometry-processed triangle and the divided upper and lower triangles;

a green color component adder coupled to the resistor for fetching the information about the geometry-processed triangle and the divided upper and lower triangles from the resistor and computing a green component of the color of the geometry-processed triangle and the divided upper and lower triangles; and a blue color component adder coupled to the resistor for fetching the information about the geometry-processed triangle and the divided upper and lower triangles from the resistor and computing a blue component of the color of the geometry-processed triangle and the divided upper and lower triangles.

5. The three-dimensional computer graphic controller as claimed in claim 3, wherein the X-coordinate initial position adder comprises:

a latch circuit for holding a signal of an X-coordinate initial position of the first edge of the triangle;

an adder having two input terminals, one of which is coupled to an output terminal of the latch circuit for receipt of an output signal of the X-coordinate initial position from the latch circuit whilst the other is coupled to the resistor for receiving signals of variations in initial position of the first edge of the triangle so that the adder performs operation of adding variations in initial position of the first edge into the X-coordinate initial position; and a selector having two input terminals, one of which is coupled to an output terminal of the adder for receipt of an added value of the X-coordinate initial position from the adder whilst the other is coupled to the resistor for receipt of an initial value of the X-coordinate initial position from the resistor so that the selector performs operation of selecting any of the added value and the initial value of the X-coordinate initial position as well as having an output terminal coupled to an input terminal of the latch circuit.

6. The three-dimensional computer graphic controller as claimed in claim 3, wherein the X-coordinate width adder comprise:

a first selector having two input terminals coupled to the resistor for receipt of signals of variations in width on the X-coordinate of the divided upper and lower triangles so that the first selector performs operation of selecting any of the variations in width on the X-coordinate of the divided upper and lower triangles;

a latch circuit for holding a signal of an X-coordinate initial position of the first edge of the triangle;

an adder having two input terminals, one of which is coupled to an output terminal of the latch circuit for receipt of an output signal of the X-coordinate initial position from the latch circuit whilst the other is coupled to an output of the first selector for receiving selected one of the variations in width on the X-coordinate of the divided upper and lower triangles so that the adder performs operation of adding the selected one of the variations in width on the X-coordinate of the divided upper and lower triangles into the X-coordinate initial position; and a second selector having two input terminals, one of which is coupled to an output terminal of the adder for receipt of an added value of the X-coordinate initial position from the adder whilst the other is coupled to the resistor for receipt of an initial value of the X-coordinate initial position from the resistor so that the second selector performs operation of selecting any of the added value and the initial value of the X-coordinate initial position as well as having an output terminal coupled to an input terminal of the latch circuit.

7. The three-dimensional computer graphic controller as claimed in claim 3, wherein each of the red, green and blue color component adders comprises:

a first latch circuit for holding a signal of a Y-coordinate initial position of the first edge of the triangle;

a first adder having two input terminals, one of which is coupled to an output terminal of the first latch circuit for receipt of an output signal of the Y-coordinate initial position from the first latch circuit whilst the other is coupled to the resistor for receiving signal of variations in initial position of the first edge of the triangle ton the Y-coordinate so that the first adder performs operation of adding variations in initial position of the first edge on the Y-coordinate into the Y-coordinate initial position;

a first selector having two input terminals, one of which is coupled to an output terminal of the first adder for receipt of an added value of the Y-coordinate initial position from the first adder whilst the other is coupled to the resistor for receipt of an initial value of the Y-coordinate initial position from the resistor so that the first selector performs operation of selecting any of the added value and the initial value of the Y-coordinate initial position as well as having an output terminal coupled to an input terminal of the first latch circuit;

a second latch circuit for holding a signal of an X-coordinate initial position of the first edge of the triangle;

a second adder having two input terminals, one of which is coupled to an output terminal of the second latch circuit for receipt of an output signal of the X-coordinate initial position from the second latch circuit whilst the other is coupled to the resistor for receiving signals of variations in initial position of the first edge of the triangle so that the second adder performs operation of adding variations in initial position of the first edge into the X-coordinate initial position; and a second selector having two input terminals, one of which is coupled to an output terminal of the second adder for receipt of an added value of the X-coordinate initial position from the adder whilst the other is coupled to the output terminal of the first selector for receipt of selected one of the added value and the initial value of the Y-coordinate initial position so that the second selector performs operation of selecting either the selected one of the added value and the initial value of the Y-coordinate initial position or the selected one of the added value and the initial value of the X-coordinate initial position as well as having an output terminal coupled to an input terminal of the second latch circuit.

8. The three-dimensional computer graphic controller as claimed in claim 1, wherein the resistor stores software-computed information comprising:

the X-coordinate of the first vertex;

the Y-coordinate of the first vertex;

a width on the y-coordinate of the geometry-processed triangle;

a width on a span including the first vertex;

variations in X-coordinate of the first edge of the geometry-processed triangle;

a Y-coordinate of the second vertex of the geometry-processed triangle;

variations in width on the X-coordinate of the divided upper triangle;

variations in width on the X-coordinate of the divided lower triangle;

an initial value of the red component of the first vertex of the geometry-processed triangle;

variations in the red component of points on the first edge of the geometry-processed triangle;

variation in the red component of the geometry-processed triangle in an X-direction parallel to an X-coordinate axis, an initial value of the green component of the first vertex of the geometry-processed triangle;

variations in the green component of points on the first edge of the geometry-processed triangle;

variations in the green component of the geometry-processed triangle in the X-direction;

an initial value of the blue component of the first vertex of the geometry-processed triangle;

variations in the blue component of points on the first edge of the geometry-processed triangle; and variation in the blue component of the geometry-processed triangle in the X-direction.

9. A three-dimensional computer graphic controller provided in a three-dimensional computer graphic system utilizing a Z-buffer method, wherein a geometry-processed triangle is so set on an X-Y coordinate system that the geometry-processed triangle comprises a first vertex having a highest Y-coordinate value, a second vertex having a lowest Y-coordinate value, a third vertex having an intermediate Y-coordinate value between the highest and lowest Y-coordinate values of the first and second vertexes, a first edge including the first and second vertexes, a second edge including the second and third vertexes and a third edge including the first and third vertexes, before the geometry-processed triangle is divided by a line parallel to the X-coordinate and extending on the third vertex and across the first edge into a divided upper triangle and a divided lower triangle, the three-dimensional computer graphic controller comprising:

a resistor for receiving information about the geometry-processed triangle and the divided upper and lower triangles and storing the same;

a Y-coordinate counter coupled to the resistor for fetching the stored information about the geometry-processed triangle from the resistor and computing Y-coordinate of the triangle;

an X-coordinate initial position adder coupled to the resistor for fetching an information about the first edge of the geometry-processed triangle from the resistor and computing an X-coordinate value of an initial position of the first edge of the triangle;

an X-coordinate width adder coupled to the resistor for fetching the information about the divided upper and lower triangles from the resistor and computing individual widths of the divided upper and lower triangles on the X-coordinate as well as for changing a variation in width on the X-coordinate between the divided upper and lower triangles;

a color component adder coupled to the resistor for fetching the information about the geometry-processed triangle and the divided upper and lower triangles from the resistor and individually computing red, green and blue components of the color of the geometry-processed triangle and the divided upper and lower triangles;

a frame memory controller coupled to the Y-coordinate counter, the X-coordinate initial position adder and the X-coordinate width adder for fetching the Y-coordinates of the triangle from the Y-coordinate counter, the X-coordinate value of the start position from the X-coordinate initial position adder and the individual widths of the divided upper and lower triangles on the X-coordinate from the X-coordinate width adder so as to control storing the Y-coordinates of the triangle, the X-coordinate value of the start position and the individual widths of the divided upper and lower triangles on the X-coordinate into a frame memory coupled to the frame memory controller;

a line buffer with a capacity corresponding to a line and being coupled to the color component adder for fetching the red, green and blue components from the color component adder and storing the fetched red, green and blue components therein;

a Z-value adder coupled to said resistor for receipt of a Z-value of the first vertex of the geometry-processed triangle;

variations in Z-value of points on the first edge of the geometry-processed triangle and variations in Z-value in an X-direction parallel to an X-coordinate axis and computing Z-values of an object;

a Z-buffer having a capacity corresponding to one line and being coupled to the frame memory for fetching Z-buffer data from the frame memory and storing the Z-buffer data therein;

a Z-buffer controller coupled to the Z-buffer for controlling the Z-buffer;

a Z-comparator coupled to the Z-value adder and the Z-buffer for comparing the stored Z-buffer data with the computed Z-values of the object; and a mask buffer coupled via the Z-buffer controller and the Z-comparator to the Z-value adder and also coupled to the memory controller for storing one bit information to be supplied to the memory controller so that according to the one bit information the memory controller controls the frame memory to store the computed Z-values of the object when the computed Z-value from the Z-value adder is more distant from the viewpoint than the Z-buffer data stored in the Z-buffer.

10. The three-dimensional computer graphic controller as claimed in claim 9, further comprising a line buffer controller coupled to the line buffer for controlling the line buffer.

11. The three-dimensional computer graphic controller as claimed in claim 9, further comprising a sequenser for controlling the resistor, the Y-coordinate counter, the X-coordinate initial position adder, the X-coordinate width adder, the color component adder, the Z-value adder, the memory controller and the Z-buffer controller.

12. The three-dimensional computer graphic controller as claimed in claim 11, wherein the color component adder comprises:

a red color component adder coupled to the resistor for fetching the information about the geometry-processed triangle and the divided upper and lower triangles from the resistor and computing a red component of the color of the geometry-processed triangle and the divided upper and lower triangles;

a green color component adder coupled to the resistor for fetching the information about the geometry-processed triangle and the divided upper and lower triangles from the resistor and computing a green component of the color of the geometry-processed triangle and the divided upper and lower triangles; and a blue color component adder coupled to the resistor for fetching the information about the geometry-processed triangle and the divided upper and lower triangles from the resistor and computing a blue component of the color of the geometry-processed triangle and the divided upper and lower triangles.

13. The three-dimensional computer graphic controller as claimed in claim 11, wherein the X-coordinate initial position adder comprises:

a latch circuit for holding a signal of an X-coordinate initial position of the first edge of the triangle;

an adder having two input terminals, one of which is coupled to an output terminal of the latch circuit for receipt of an output signal of the X-coordinate initial position from the latch circuit whilst the other is coupled to the resistor for receiving signals of variations in initial position of the first edge of the triangle so that the adder performs operation of adding variations in initial positison of the first edge into the X-coordinate initial position; and a selector having two input terminals, one of which is coupled to an output terminal of the adder for receipt of an added value of the X-coordinate initial position from the adder whilst the other is coupled to the resistor for receipt of an initial value of the X-coordinate initial position from the resistor so that the selector performs operation of selecting any of the added value and the initial value of the X-coordinate initial position as well as having an output terminal coupled to an input terminal of the latch circuit.

14. The three-dimensional computer graphic controller as claimed in claim 11, wherein the X-coordinate width adder comprise:

a first selector having two input terminals coupled to the resistor for receipt of signal of variations in width on the X-coordinate of the divided upper and lower triangles so that the first selector performs operation of selecting any of the variations in width on the X-coordinate of the divided upper and lower triangles;

a latch circuit for holding a signal of an X-coordinate initial position of the first edge of the triangle;

an adder having two input terminals, one of which is coupled to an output terminal of the latch circuit for receipt of an output signal of the X-coordinate initial position from the latch circuit whilst the other is coupled to an output of the first selector for receiving selected one of the variations in width on the X-coordinate of the divided upper and lower triangles so that the adder performs operation of adding the selected one of the variations in width on the X-coordinate of the divided upper and lower triangles into the X-coordinate initial position; and a second selector having two input terminals, one of which is coupled to an output terminal of the adder for receipt of an added value of the X-coordinate initial position from the adder whilst the other is coupled to the resistor for receipt of an initial value of the X-coordinate initial position from the resistor so that the second selector performs operation of selecting any of the added value and the initial value of the X-coordinate initial position as well as having an output terminal coupled to an input terminal of the latch circuit.

15. The three-dimensional computer graphic controller as claimed in claim 11, wherein each of the red, green and blue color component adders comprises:

a first latch circuit for holding a signal of a Y-coordinate initial position of the first edge of the triangle;

a first adder having two input terminals, one of which is coupled to an output terminal of the first latch circuit for receipt of an output signal of the Y-coordinate initial position from the first latch circuit whilst the other is coupled to the resistor for receiving signals of variations in initial position of the first edge of the triangle on the Y-coordinate so that the first adder performs operation of adding variations in initial position of the first edge on the Y-coordinate into the Y-coordinate initial position;

a first selector having two input terminals, one of which is coupled to an output terminal of the first adder for receipt of an added value of the Y-coordinate initial position from the first adder whilst the other is coupled to the resistor for receipt of an initial value of the Y-coordinate initial position from the resistor so that the first selector performs operation of selecting any of the added value and the initial value of the Y-coordinate initial position as well as having an output terminal coupled to an input terminal of the first latch circuit;

a second latch circuit for holding a signal of an X-coordinate initial position of the first edge of the triangle;

a second adder having two input terminals, one of which is coupled to an output terminal of the second latch circuit for receipt of an output signal of the X-coordinate initial position from the second latch circuit whilst the other is coupled to the resistor for receiving signals of variations in initial position of the first edge of the triangle so that the second adder performs operation of adding variations initial position of the first edge into the X-coordinate initial position; and a second selector having two input terminals, one of which is coupled to an output terminal of the second adder for receipt of an added value of the X-coordinate initial position from the adder whilst the other is coupled to the output terminal of the first selector for receipt of selected one of the added value and the initial value of the Y-coordinate initial position so that the second selector performs operation of selecting either the selected one of the added value and the initial value of the Y-coordinate initial position or the selected one of the added value and the initial value of the X-coordinate initial position as well as well as having an output terminal coupled to an input terminal of the second latch circuit.

16. The three-dimensional computer graphic controller as claimed in claim 9, wherein the resistor stores software-computed information comprising:

the X-coordinate of the first vertex;

the Y-coordinate of the first vertex;

a width on the y-coordinate of the geometry-processed triangle;

a width of a span including the first vertex;

variations in X-coordinate of the first edge of the geometry-processed triangle;

a Y-coordinate of the second vertex of the geometry-processed triangle;

variations in width on the X-coordinate of the divided upper triangle;

variations in width on the X-coordinate of the divided lower triangle;

an initial value of the red component of the first vertex of the geometry-processed triangle;

variation in the red component of points on the first edge of the geometry-processed triangle;

variation in the red component of the geometry-processed triangle in an X-direction parallel to an X-coordinate axis;

an initial value of the green component of the first vertex of the geometry-processed triangle;

variations in the green component of points on the first edge of the geometry-processed triangle;

variation in the green component of the geometry-processed triangle in the X-direction;

an initial value of the blue component of the first vertex of the geometry-processed triangle;

variation in the blue component of points on the first edge of the geometry-processed triangle;

variation in the blue component of the geometry-processed triangle in the X-direction;

the Z-value of the first vertex of the geometry-processed triangle;

the variation in Z-value of the points on the first edge of the geometry-processed triangle and the variations in Z-value in the X-direction.

* * * * *